US012340050B2

(12) United States Patent
Nakanishi et al.

(10) Patent No.: US 12,340,050 B2
(45) Date of Patent: Jun. 24, 2025

(54) SENSOR SYSTEM, METHOD FOR DRIVING SENSOR MODULE AND STORAGE MEDIUM

(71) Applicant: Japan Display Inc., Tokyo (JP)

(72) Inventors: Takayuki Nakanishi, Tokyo (JP); Yuto Kakinoki, Tokyo (JP); Tadashi Hanegi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/581,855

(22) Filed: Feb. 20, 2024

(65) Prior Publication Data

US 2024/0319820 A1 Sep. 26, 2024

(30) Foreign Application Priority Data

Mar. 24, 2023 (JP) ................................. 2023-048690

(51) Int. Cl.
*G06F 3/041* (2006.01)
(52) U.S. Cl.
CPC .. *G06F 3/0418* (2013.01); *G06F 2203/04108* (2013.01)
(58) Field of Classification Search
None
See application file for complete search history.

(56) References Cited

U.S. PATENT DOCUMENTS

| | | | |
|---|---|---|---|
| 2013/0342498 A1 | 12/2013 | Kim et al. | |
| 2014/0049486 A1 | 2/2014 | Kim et al. | |
| 2014/0049508 A1 | 2/2014 | Kim et al. | |
| 2015/0169114 A1* | 6/2015 | King | G06F 3/0446 345/174 |
| 2015/0277760 A1* | 10/2015 | Tagaya | G06F 3/04886 715/711 |
| 2023/0161443 A1* | 5/2023 | Ziraknejad | G06F 3/04186 327/517 |

* cited by examiner

*Primary Examiner* — Stephen T. Reed
(74) *Attorney, Agent, or Firm* — K&L Gates LLP

(57) ABSTRACT

A sensor system according to an embodiment includes: a noncontact sensor module arranged on a display module; and a processor configured to drive the sensor module, wherein the sensor module is configured to detect a first coordinate and a second coordinate of a detection target, the second coordinate is detected before the first coordinate is detected, the processor is configured to calculate move information indicating a moving direction of the detection target in the first coordinate based on the first coordinate and the second coordinate detected by the sensor module, and calculate a correction amount in the first coordinate based on the move information when the detection target approaches the sensor module and a distance between the sensor module and the detection target reaches a correction start distance.

15 Claims, 19 Drawing Sheets

SENSOR SYSTEM, METHOD FOR DRIVING SENSOR MODULE AND STORAGE MEDIUM

CROSS REFERENCE TO RELATED APPLICATIONS

This application claims the benefit of priority to Japanese Patent Application No. 2023-048690, filed on Mar. 24, 2023, the entire contents of which are incorporated herein by reference.

FIELD

An embodiment of the present invention relates to a sensor system. For example, an embodiment of the present invention relates to a sensor system including a display device on which a noncontact sensor module is mounted, and a method for driving the sensor module in the sensor system.

BACKGROUND

A touch sensor is widely used as an interface for inputting information to an information terminal. Currently, a mainstream touch sensor specifies a position where a finger or a palm of a person or an input jig such as a touch pen (hereinafter, these are referred to as "detection targets") directly contacts the touch sensor (U.S. Patent Application Publication No. 2014/0049486, U.S. Patent Application Publication No. 2013/0342498, and U.S. Patent Application Publication No. 2014/0049508). On the other hand, in recent years, a noncontact sensor (hover sensor) has been developed in which information can be input simply by positioning a detection target in a vicinity of the touch sensor without contacting the detection target with the touch sensor.

SUMMARY

A sensor system according to an embodiment of the present invention includes: a noncontact sensor module arranged on a display module; and a processor configured to drive the sensor module, wherein the sensor module is configured to detect a first coordinate and a second coordinate of a detection target, the second coordinate is detected before the first coordinate is detected, the processor is configured to calculate move information indicating a moving direction of the detection target in the first coordinate based on the first coordinate and the second coordinate detected by the sensor module, and calculate a correction amount in the first coordinate based on the move information when the detection target approaches the sensor module and a distance between the sensor module and the detection target reaches a correction start distance.

A method for driving noncontact sensor module arranged on a display module according to an embodiment of the present invention includes: deriving move information indicating a moving direction of a detection target in a first coordinate based on the first coordinate of the detection target and a second coordinate of the detection target, the first coordinate and the second coordinate being detected by the sensor module, the second coordinate being detected before the first coordinate is detected; and deriving a correction amount in the first coordinate based on the move information when the detection target approaches the sensor module and a distance between the sensor module and the detection target reaches a correction start distance.

A storage medium storing a program executed by a processor of a noncontact sensor module arranged on a display module includes: deriving move information indicating a moving direction of a detection target in a first coordinate based on the first coordinate of the detection target and a second coordinate of the detection target, the first coordinate and the second coordinate being detected by the sensor module, the second coordinate being detected before the first coordinate is detected; and deriving a correction amount in the first coordinate based on the move information when the detection target approaches the sensor module and a distance between the sensor module and the detection target reaches a correction start distance.

DESCRIPTION OF EMBODIMENTS

Figure 1:
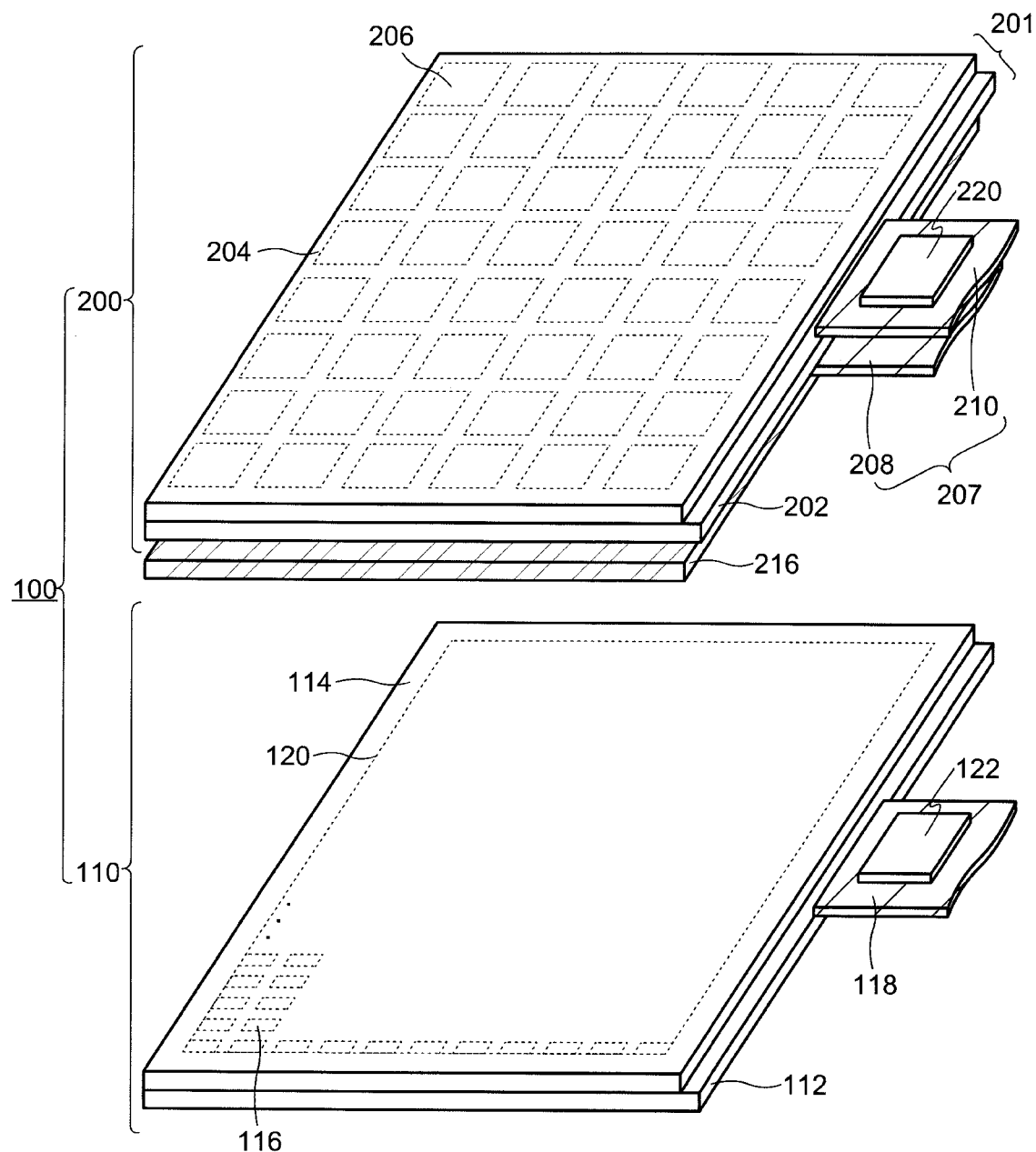
FIG. 1 is a schematic exploded perspective view of a display device included in a sensor system according to an embodiment of the present invention.

Hereinafter, each of the embodiments of the present invention will be described with reference to the drawings. The following disclosure is merely an example. A configuration that can be easily conceived by a person skilled in the art by appropriately changing the configuration of the embodiment while keeping the gist of the invention is naturally included in the scope of the present invention. For clarity of explanation, the drawings may be schematically represented with respect to widths, thicknesses, shapes, and the like of respective portions as compared with actual embodiments. However, the shown shapes are merely examples, and do not limit the interpretation of the present invention. In the present specification and the drawings, the same reference signs are given to the same components as the components described previously with respect to the drawings already shown, and detailed description thereof may be omitted as appropriate.

In each of the embodiments of the present invention, a direction from a display module 110 toward a sensor module 200 is referred to as "above" or "upper". Conversely, a direction from the sensor module 200 toward the display module 110 is referred to as "below" or "lower". As described above, for convenience of explanation, although the phrase "upper" or "lower" is used for description, for example, the vertical relationship between the display module 110 and the sensor module 200 may be arranged in a different direction from the drawing. In the following description, for example, the expression "sensor module 200 on the display module 110" merely describes the vertical relationship between the display module 110 and the sensor module 200 as described above, and other members may be arranged between the display module 110 and the sensor module 200. The term "upper" or "lower" means a stacking order in a structure in which a plurality of layers are stacked. In the case of expressing "a pixel electrode above a transistor", a positional relationship may be employed in which the transistor and the pixel electrode do not overlap each other in a plan view. On the other hand, the expression "a pixel electrode vertically above a transistor" means a positional relationship in which the transistor and the pixel electrode overlap each other in a plan view.

As used herein, the terms "film" and "layer" can optionally be interchanged with one another.

A "display device" refers to a structure that displays an image using an electro-optical layer. For example, the term display device may refer to a display panel including an electro-optical layer, or may refer to a structure in which another optical member (for example, a polarizing member, a backlight, a touch panel, or the like) is attached to a display cell. The "electro-optical layer" may include a liquid crystal layer, an electroluminescent (EL) layer, an electrochromic (EC) layer or an electrophoretic layer as long as there is no technical inconsistency. Therefore, although an embodiment to be described later will be described by exemplifying a liquid crystal display device including a liquid crystal layer and an organic EL display device including an organic EL layer as a display device, the structure of the present embodiment can be applied to a display device including another electro-optical layer described above.

As used herein, the expression "a includes A, B, or C," "a includes any of A, B, or C," and "a includes one selected from the group consisting of A, B, and C" does not exclude the case where a includes a plurality of combinations of A to C unless otherwise specified. Furthermore, these expressions do not exclude the case where a includes other elements.

In addition, the following embodiments can be combined with each other as long as there is no technical inconsistency.

An object of an embodiment of the present invention is to provide a new sensor system and a method for driving the sensor system. Alternatively, an object of an embodiment of the present invention is to provide a new sensor system including a display device and a new method for driving a sensor module in the sensor system. Alternatively, an object of an embodiment of the present invention is to provide a sensor system including a display device on which a sensor module is mounted having excellent operation capabilities from an ergonomic point of view, and a method for driving the sensor module in the sensor system. Alternatively, an object of an embodiment of the present invention is to provide a storage medium in which a program for realizing the driving method described above is stored.

1. First Embodiment

Referring to FIG. 1 to FIG. 12, a sensor system, a method for driving the sensor system, and a program for realizing the method according to an embodiment of the present invention will be described.

[1-1. Sensor System]

Figure 2:
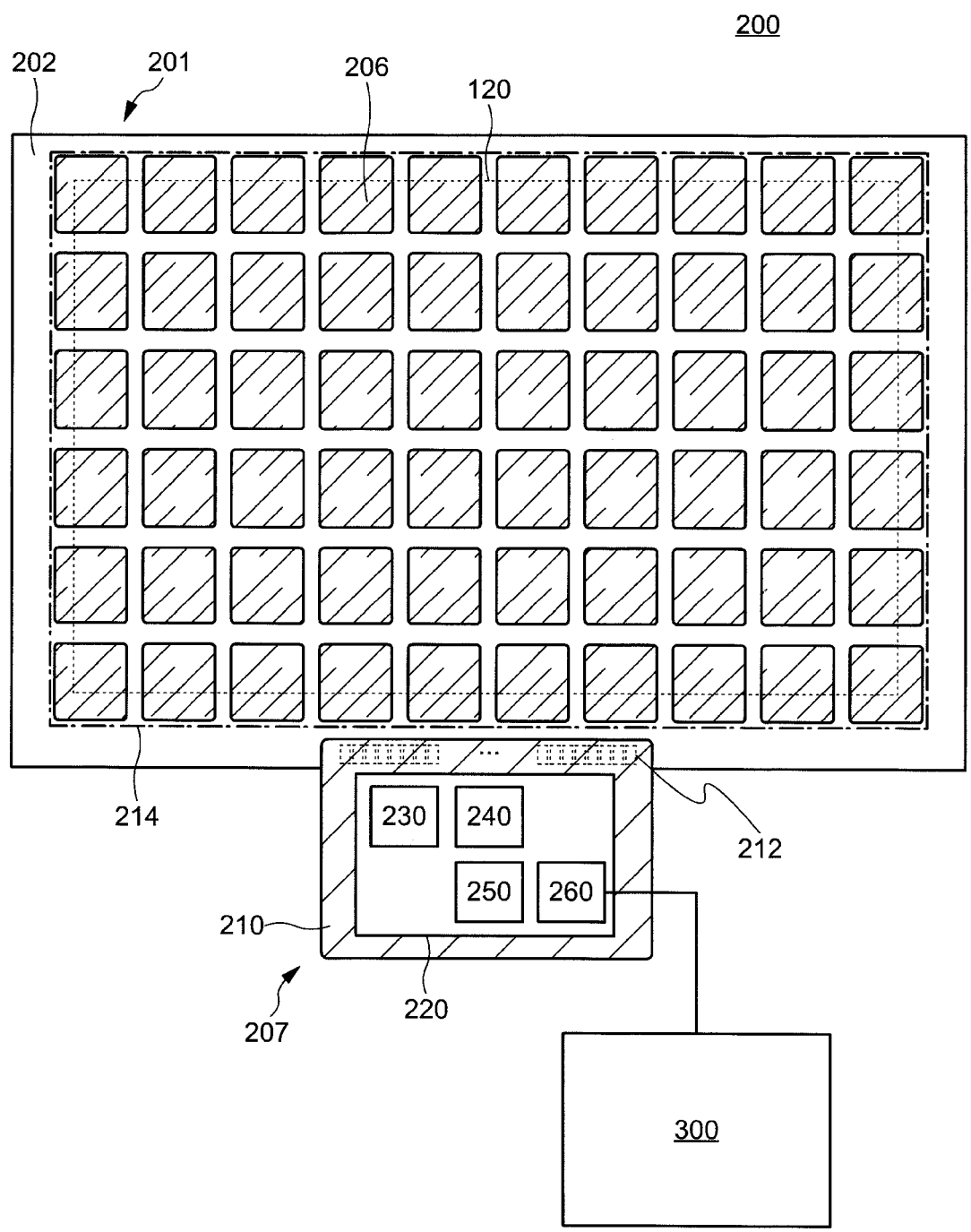
FIG. 2 is a schematic top view of a sensor module of a display device included in a sensor system according to an embodiment of the present invention.
Figure 3:
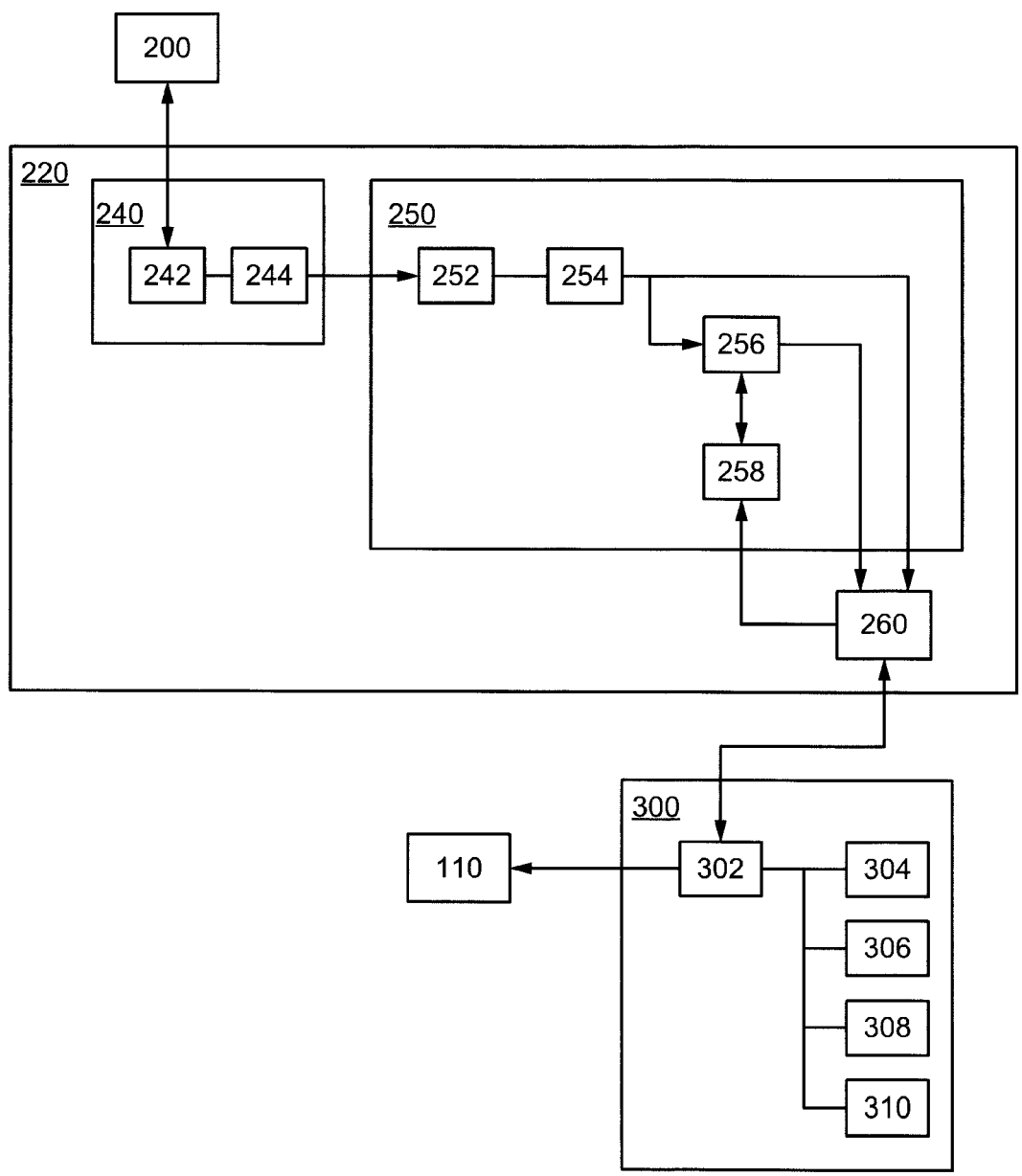
FIG. 3 is a block diagram of a sensor system according to an embodiment of the present invention.

A sensor system according to an embodiment of the present invention is shown in FIG. 1 and FIG. 2. The sensor system includes a sensor module 200 and a processor 220. In the sensor system, the sensor module 200 may be incorporated in a display device 100. In this case, the sensor system includes the display device 100 and the processor 220. The sensor system may further include the processor 220 and a computing device 300 coupled to the display device 100.

[1-2. Display Device]

FIG. 1 is a schematic exploded perspective view of the display device 100. The display device 100 includes a display module 110 and the sensor module 200. The sensor module 200 is arranged on the display module 110. The display module 110 and the sensor module 200 may be secured to each other by an adhesive layer not shown in FIG. 1.

[1-3. Display Module]

The display module 110 is a device having a function of displaying an image in accordance with instructions from the computing device 300 connected to the display module 110. The display module 110 includes an array substrate 112, a plurality of pixels 116 formed on the array substrate 112, and a counter substrate 114 covering the plurality of pixels 116 as a basic configuration. Although not shown, a driving circuit for controlling the pixel 116 is arranged on the array substrate 112. A region surrounding the plurality of pixels 116 is referred to as a display region 120. Each of the pixels 116 includes a display element and functions as a minimum unit for providing color information.

A liquid crystal element, an electroluminescent element exemplified as an inorganic electroluminescent element (LED) or an organic electroluminescent element (OLED), or the like is used as the display element. In the case where a liquid crystal element is used, a light source (backlight) which is not shown is further arranged in the display module 110. Each of the pixels 116 operates in accordance with a power and a video signal supplied from the computing device 300 via a first connector 118, such as a flexible printed circuit (FPC) board, to provide light of a particular color with a gradation based on the video signal. Video can be displayed on the display region 120 by controlling the operation of the pixel 116 based on the video signal. The plurality of pixels 116 are arranged such that an image is viewed through the sensor module 200.

A size of the display module 110 is not limited. For example, the size of the display module 110 may be a size used for a portable communication terminal called a 12.1 inch (31 cm) size or the like, may be a size suitable for a monitor, a TV, or a signage connected to a computer (for example, a size of 14.1 inches (36 cm) to 32 inches (81 cm)), and may be a larger size. More specifically, the size of the display module 110 may be sized to fit a display device incorporated into an in-vehicle display device, a cash register, or an automatic teller machine.

[1-4. Sensor Module]

The sensor module 200 is a device that transmits light from the display module 110 and functions as an interface for inputting information to the display device 100. The sensor module 200 is a noncontact sensor module (hover sensor). The sensor module 200 detects a detection target not only when a detection target such as a finger, a palm, or a touch pen is in direct contact with the sensor module 200 but also when the detection target approaches the sensor module 200. The sensor module 200 has a function of specifying a position (hereinafter, simply referred to as an input position) of the detection target on the sensor module 200 when the detection target is detected. A distance at which the sensor module 200 detects the detection target can be set as appropriate, for example, a range within 5 mm, within 20 mm, within 50 mm, or within 100 mm from the outermost surface of the sensor module 200. As will be described later, a threshold distance is set in the sensor system for the sensor module 200 to determine whether there is an input from the detection target.

As shown in FIG. 1 and FIG. 2, the sensor module 200 includes a sensor panel 201 and a connector unit 207 connected to the sensor panel. The sensor panel 201 is arranged on the display region 120 of the display module 110. In other words, the sensor panel 201 is arranged on the display screen. The sensor panel 201 includes a sensor substrate 202 and a cover substrate 204 facing the sensor substrate 202. Each of the sensor substrate 202 and the cover substrate 204 is an insulating substrate, and is made of a material that transmits visible light in order to visually recognize an image displayed by the display module 110. For this reason, the sensor substrate 202 and the cover substrate 204 are made of an inorganic material such as glass and quartz, or a polymer material such as polyimide, polyamide, and polycarbonate. The sensor substrate 202 and/or the cover substrate 204 may have flexibility sufficient enough to be deformed arbitrarily, or may have low flexibility so as not to be plastically deformable.

A plurality of sensor electrodes 206 are arranged between the sensor substrate 202 and the cover substrate 204. The plurality of sensor electrodes 206 are arranged in a matrix having a plurality of rows and columns. A region in which the plurality of sensor electrodes 206 are arranged is referred to as a sensor region 214. The sensor electrode 206 is arranged such that the sensor region 214 overlaps the display region 120. The number (for example, the number of rows and columns) and a size (area) of the sensor electrode 206 are appropriately set according to a size of the display device 100, detection accuracy required by the sensor module 200, and the like. For example, the number of rows and columns may be 5 or more and 10 or less and 5 or more and 15 or less, respectively. As can be understood from FIG. 1, each of the sensor electrodes 206 has a larger area than the pixel 116 and is arranged so as to overlap the plurality of pixels 116.

The sensor electrode 206 includes a transparent oxide, such as indium-tin mixed oxide (ITO) and indium-zinc mixed oxide (IZO). Alternatively, the sensor electrode 206 may comprise a metal (zero valent metal) such as titanium, molybdenum, tungsten, aluminum, and copper, or an alloy comprising one or more of these metals. In this case, in order to ensure light transmittance, the sensor electrode 206 may be formed in a mesh shape having a plurality of openings.

A sensor wiring (not shown) electrically connected to the sensor electrode 206 extends from each of the sensor electrodes 206 to one side of the sensor substrate 202, and forms a terminal 212 at an end portion of the sensor substrate 202 (FIG. 2). A second connector 210, such as a flexible printed circuit (FPC) substrate, is electrically connected to the terminal 212 (FIG. 1 and FIG. 2).

A noise shield layer 216 for shielding electrical effects from the display module 110 is arranged between the sensor substrate 202 of the sensor module 200 and the counter substrate 114 of the display module 110 (see FIG. 1). The noise shield layer 216 may include a transparent oxide such as ITO and IZO, or a metallic material. In the latter case, a mesh-like metal film having a plurality of openings is used as the noise shield layer 216 so that visible light can be transmitted. The noise shield layer 216 is arranged so as to overlap the plurality of sensor electrodes 206. A third connector 208 such as an FPC substrate is electrically connected to the noise shield layer 216, and an AC voltage having a pulse-like or sinusoidal waveform in phase with a potential applied to the sensor electrode 206 is applied thereto. Therefore, the noise shield layer 216 and the sensor electrode 206 are always equipotential.

[1-5. Computing Device]

The computing device 300 is an electronic device having a computing function, and is, for example, a desktop computer, a notebook personal computer, or a portable communication terminal such as a tablet and a smartphone. Alternatively, the computing device 300 may be an information processing device (for example, a microcomputer) incorporated in various apparatuses on which the display device 100 is mounted. As shown in the block diagram of FIG. 3, the computing device 300 includes a control unit 302 that controls an operation of the computing device 300, a storage unit 304, a communication unit 306 controlled by the control unit 302, an audio output unit 308, a power supply 310, and the like.

The control unit 302 includes a processing device such as a central processing unit (CPU), and executes various processes by operating a basic application program stored in the storage unit 304 and a program for realizing various driving methods. The storage unit 304 includes a volatile main storage device and a non-volatile auxiliary storage device. The main memory device may be a random access memory (RAM) or a dynamic random access memory (DRAM). The auxiliary storage device is a read only memory (ROM), a flash memory, a hard disk drive, or the like. The basic application program or programs are stored in the auxiliary storage device constituting the storage unit 304.

The communication unit 306 has a function of communicating with an external electronic device (not shown) via a network. The audio output unit 308 is a speaker having a function of generating various sounds. The power supply 310 is a secondary battery such as a lithium-ion battery, and is supplied with electric power from an external power supply to store the electric power, and when the external power supply is unavailable, the electric power is supplied to the control unit 302, the display device 100, and the like.

Inputs to the computing device 300 can be performed using the sensor module 200. Accordingly, the display device 100 including the sensor module 200 functions as an input/output unit of the computing device 300. An input using the sensor module 200 will be described later. Although not shown, as an input device to the computing device 300, the computing device 300 may further include a keyboard, operation buttons, a mouse, and the like.

The computing device 300 is connected to the display module 110 via the first connector 118 and to the sensor module 200 via the second connector 210. A drive circuit 122 for generating a signal to be supplied to the pixel 116 is arranged on the first connector 118. The control unit 302 operates in accordance with an instruction of an application installed in the computing device 300, and a video signal is supplied to the drive circuit 122. The drive circuit 122 generates a signal to be supplied to each of the pixels 116 based on the video signal, and controls the pixels 116. As a result, an image is displayed on the display region 120 in accordance with the application. In addition, the drive circuit 122 may not be arranged on the first connector 118 but may be formed on the array substrate 112.

[1-6. Processor]

The second connector 210 is arranged with the processor 220 that functions as a drive circuit. The processor 220 is formed by an integrated circuit formed on a silicon semiconductor substrate. The processor 220 drives the sensor module 200 in a noncontact manner. The processor 220 is electrically connected to the display device 100 and the computing device 300. For example, the processor 220 includes a power supply circuit 230, a detector 240, an arithmetic element 250, an interface 260, and the like (see FIG. 2 and FIG. 3). In addition, the processor 220 may not be arranged on the second connector 210 but may be arranged on the sensor substrate 202.

The power supply circuit 230 converts electric power supplied from an external power supply (not shown) via the computing device 300 into a pulsed AC voltage (AC square wave), and supplies the AC voltage to each of the sensor electrodes 206 via the terminal 212 and the sensor wiring.

The detector 240 is also referred to as an analog front end (AFE: Analog Front End), and includes a signal detection unit 242 and an analog/digital conversion unit (A/D conversion unit) 244. A variation in capacitance of the sensor electrode 206 is detected as a potential variation by the signal detection unit 242, and the potential variation is digitized by the A/D conversion unit 244 and converted into a detection signal.

The arithmetic element 250 includes a signal processing unit 252, a coordinate calculation unit 254, a determination unit 256, a storage unit 258, and the like. The signal processing unit 252 performs various kinds of process on the detection signal input from the A/D converting unit 244. Examples of the process for the detection signal include known processes, and examples thereof include a noise reduction process, baseline correction, and linear conversion process. A position of the detection target on the sensor region 214 and a distance from the sensor module 200 to the detection target are calculated by the detection signal processed by the signal processing unit 252 being processed by the coordinate calculation unit 254. That is, three-dimensional coordinates of the detection target with respect to the sensor module 200 are calculated. Two-dimensional coordinates on the sensor module 200 are determined using a distribution of sensor values. The sensor value is an index indicating a potential variation in the plurality of sensor electrodes 206 in which the detection target approaches. On the other hand, the distance from the sensor module 200, which is the coordinate of the third dimension, to the detection target is determined by the intensity of the sensor value. The calculated three-dimensional coordinates are input to the computing device 300 via the interface 260. As a result, the computing device 300 can obtain the three-dimensional coordinates of the detection target.

The interface 260 is used to connect to the computing device 300 and is configured based on standards such as Universal Serial Bus (USB) and Serial Peripheral Interface (SPI). The storage unit 258 is a device including a volatile or non-volatile memory element. The storage unit 258 stores a threshold distance from the sensor module 200 to the detection target, a threshold distance from a specific point to the detection target, and a threshold resting time of the detection target at a specific point set by the computing device 300. These pieces of information are arranged from the storage unit 304 of the computing device 300 via the interface 260.

The determination unit 256 compares the various threshold distances in the three-dimensional coordinates of the detection target in contact with or close to the sensor module 200 with the distances from the sensor module 200 to the detection target. Further, in the case of determining that the distance from the sensor module 200 to the detection target is equal to or less than the threshold distance, the determination unit 256 determines that an input operation (for example, a "tap operation" or a "touch operation") by the detection target is performed even if the detection target is not in contact with the sensor module 200. Conversely, in the case of determining that the distance from the sensor module 200 to the detection target exceeds the threshold distance, the determination unit 256 determines that the input operation has not been performed. Determination results by the determination unit 256 are transmitted to the control unit 302 of the computing device 300 via the interface 260. The control unit 302 provides a video signal of a video corresponding to the input operation to the display module 110 in accordance with an instruction of a program based on the determination results.

In the sensor system described above, the processor 220 is arranged on the second connector 210 or the sensor substrate 202. However, all or part of the processor 220 may be arranged on the computing device 300. Alternatively, all or part of the functions of the processor 220 may be realized in the computing device 300. For example, the detector 240 and/or the arithmetic element 250 may be mounted on the computing device 300. Alternatively, all or part of the functions of the detector 240 and/or the arithmetic element 250 may be realized in the computing device 300.

[1-7. Problems in Conventional Sensor System]

Problems in the conventional sensor system will be described.

Figure 4:
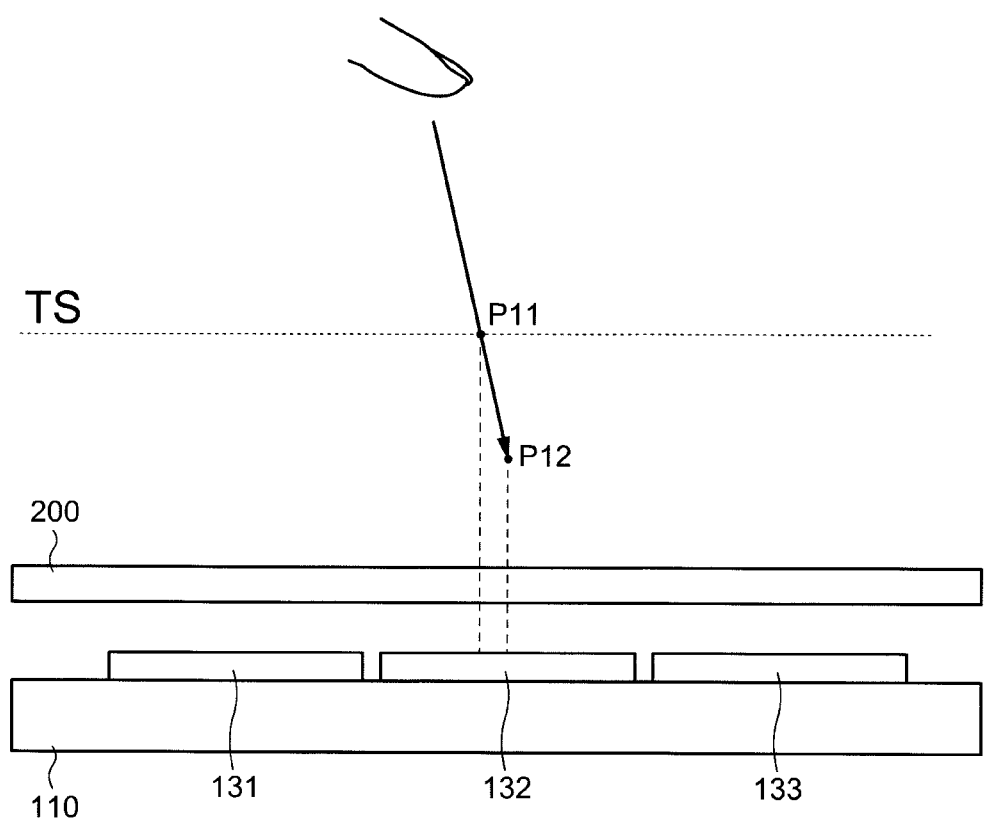
FIG. 4 is a schematic diagram showing a case where a detection target is brought close to a conventional display device with a noncontact sensor module.
Figure 5:
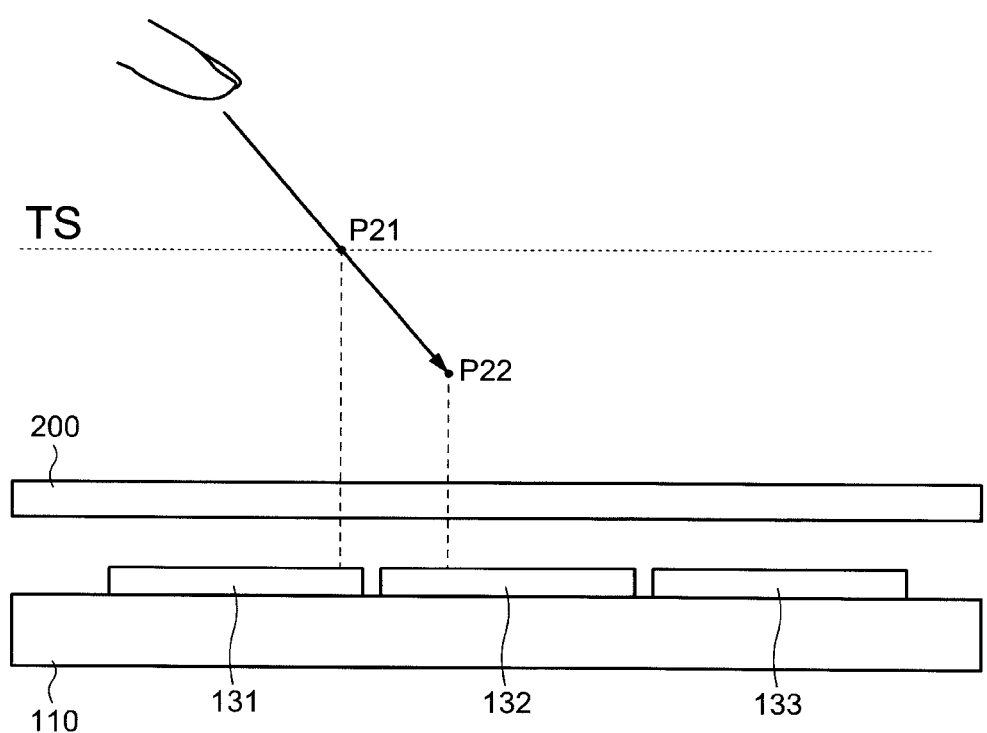
FIG. 5 is a schematic diagram showing a case where a detection target is brought close to a conventional display device with a noncontact sensor module.
Figure 6:
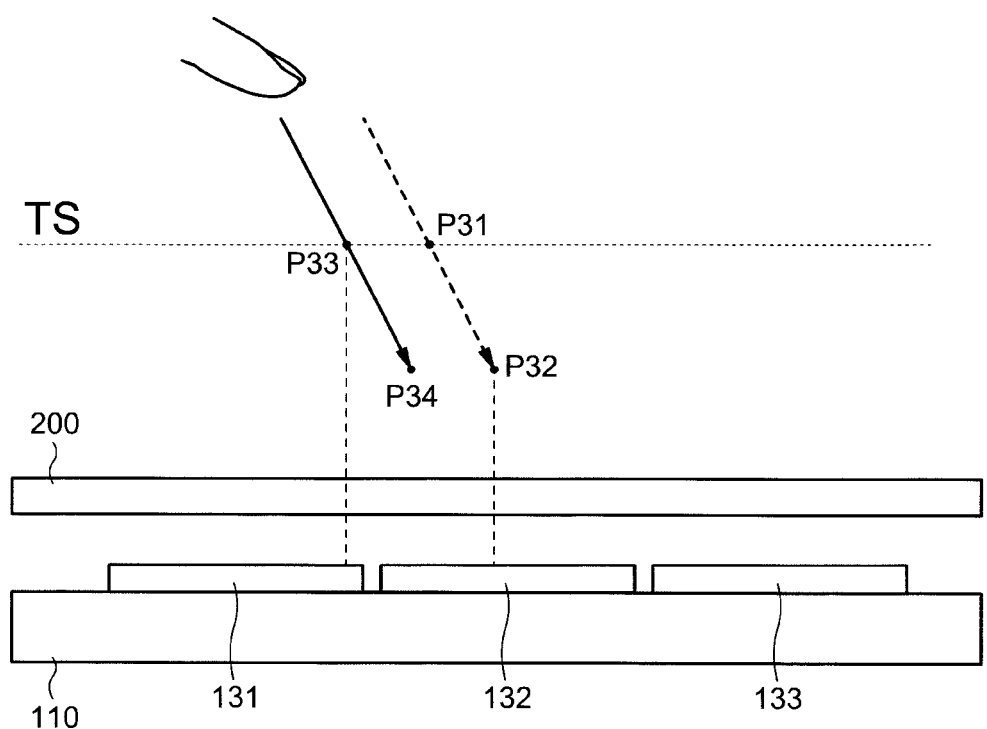
FIG. 6 is a schematic diagram showing a case where a detection target is brought close to a conventional display device with a noncontact sensor module.

FIG. 4 to FIG. 6 are schematic diagrams showing a case where a user brings a detection target such as a finger close to a conventional display device with a noncontact sensor module. In FIG. 4 to FIG. 6, target displays 131, 132, and 133 displayed by the plurality of pixels 116 are shown on the display module 110. The target displays are aligned along an x-axis. For example, the target display is a numeric keypad. The sensor module 200 is arranged at a position facing the display module 110. Members between the display module 110 and the sensor module 200 are omitted.

A dotted line displayed above the sensor module 200 (in the positive direction of a z-axis) indicates a position where a distance from the sensor module 200 (or the sensor panel 201) is an input determination distance TS. The input determination distance TS is a distance between the sensor module 200 and the detection target in a condition where the processor 220 detects that the input operation has been performed by the detection target. That is, when the distance between the sensor module 200 and the detection target exceeds the input determination distance TS, the processor 220 does not detect the input operation. On the other hand, when the distance is equal to or smaller than the input determination distance TS, the processor 220 detects the input operation. In these drawings, solid arrows indicate trajectories of the detection targets. In the following explanation, the fact that the detection target approaches the sensor module 200 and the distance between the sensor module 200 and the detection target reaches the input determination distance TS may be referred to as "the detection target reaches the input determination distance TS".

In FIG. 4, the user moves the detection target with the aim of a point P12 in order to perform an input operation on the target display 132. As shown in FIG. 4, when the detection target approaches the sensor module 200 (target display 132) along the trajectory and reaches the input determination distance TS, the processor 220 determines a position (point P11) of the detection target in the input determination distance TS as a position at which the input operation is detected.

On the other hand, the detection target approaches the sensor module 200 even after the input determination distance TS is reached, and moves to the input position (point P12) targeted by the user. That is, a shift (difference) occurs between the input position (point P12) recognized by the user and the position (point P11) of the input operation detected by the processor 220. In the case where the point P11 and the point P12 are projected onto two-dimensional coordinates (xy coordinates), the distance between the two is the shift between the input position targeted by the user and the position of the input operation detected by the processor 220. In the case where the detection target approaches the target display 132, and in the case where the detection target approaches the sensor module 200 at an angle close to perpendicular to a main surface of the sensor module 200, the shift between the target input position and the position of the detected input operation by the user is small, thereby an erroneous recognition of the input operation is unlikely to occur. Accordingly, the processor 220 detects the input operation on the target display 132 as well as the aim of the user.

On the other hand, in FIG. 5, when performing an input operation on the target display 132, the user moves the detection target to the sensor module 200 in a direction in which an angle formed by the detection target with respect to the main surface of the sensor module 200 is closer to the horizontal direction than in FIG. 4. Consequently, as shown in FIG. 5, the shift between a position (point P21) of the detection target and an input position (point P22) targeted by the user in the input determination distance TS is larger than the shift between the point P11 and the point P12 in FIG. 4. Therefore, despite the user's aim being the target display 132, the processor 220 detects an input operation on the target display 131 next to the target display 132.

As shown in FIG. 5, in the case where an angle formed between the moving direction of the detection target and the main surface of the sensor module 200 is close to horizontal, an erroneous recognition of the input operation is likely to occur.

Further, FIG. 6 shows the case where the position of the input operation intended by the user and the position of the detection target actually operated by the user are shifted. For example, in the case where the user brings the detection target close to the main surface of the sensor module 200 in an oblique direction, the position of the detection target and the position of the input operation intended by the user may be different due to the user's sense of operation. In FIG. 6, a dotted line represents a virtual trajectory of the input operation intended by the user, and a solid line represents a trajectory (real trajectory) of the detection target. The virtual trajectory is a trajectory of a detection target imaged by the user.

As shown in FIG. 6, the virtual trajectory reaches a point P32 via a point P31 in the input determination distance TS, whereas the real trajectory reaches a point P34 via a point P33 in the input determination distance. That is, even in the case where the user recognizes that the detection target has moved to the point P32, the detection target actually moves to the point P34 via the point P33. In this case, the processor 220 detects an input operation at the position of the point P33. Therefore, although the user recognizes that an input operation has been performed on the target display 132, the processor 220 determines that an input operation has been performed on the target display 131. As described above, there is a case where an input operation is erroneously recognized due to the user's sense of operation.

[1-8. Coordinate Correction Method for Sensor System]

The sensor system according to the present embodiment detects the coordinates of the detection target, and displays the detected coordinates by a cursor, a pointer, or the like to cause the user to recognize a detected position. The sensor system corrects the coordinates of the detected object detected by the processor 220, and displays a cursor on the corrected coordinates on the display device 100. In the present embodiment, the processor 220 calculates movement information of the detection target by the method shown in FIG. 7, calculates a shift amount by the method shown in FIG. 8 using the movement information, corrects the coordinates of the detection target based on the shift amount, and displays a cursor or the like on the corrected coordinates.

Figure 7:
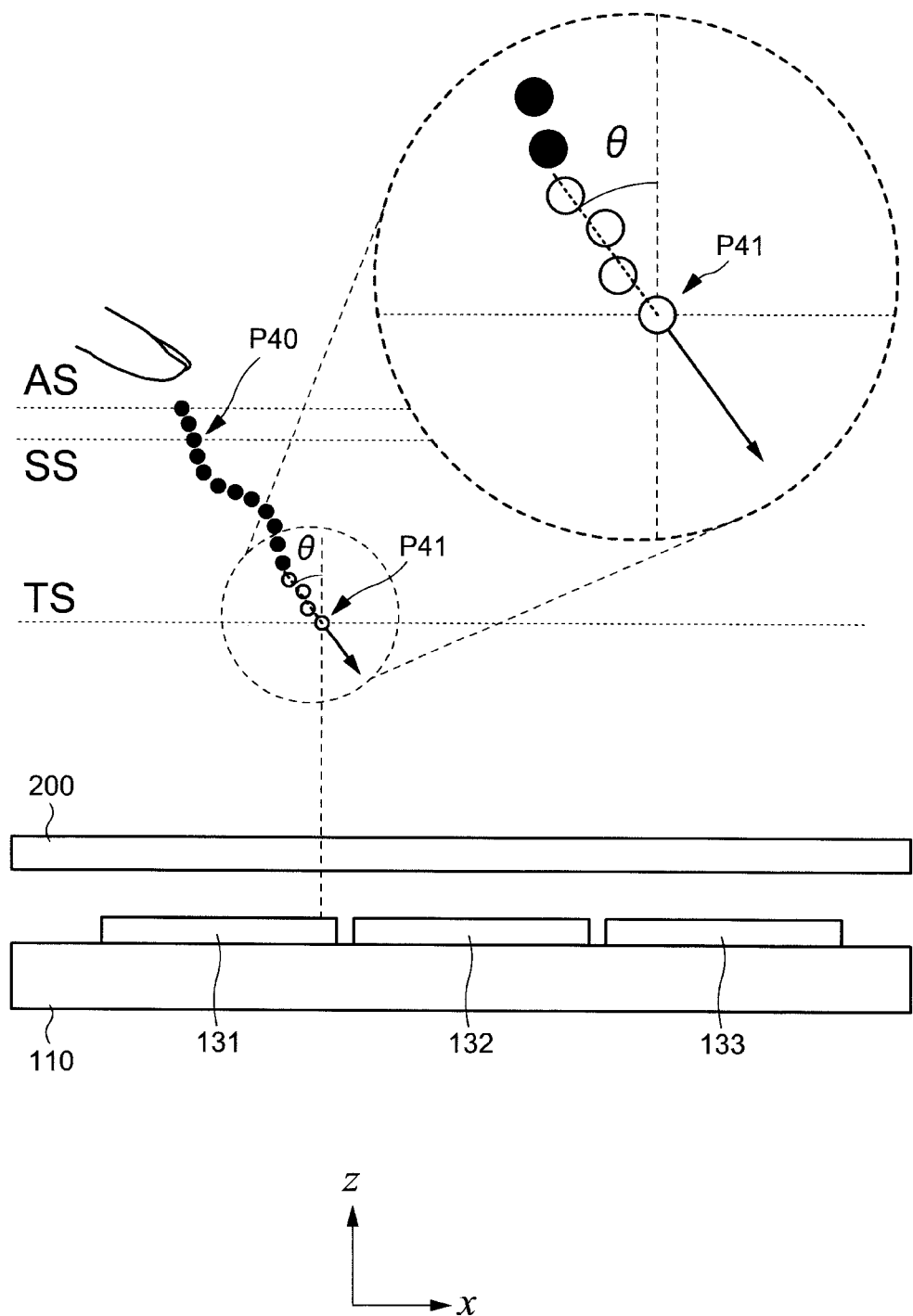
FIG. 7 is a schematic diagram showing a correction method of a sensor system according to the embodiment of the present invention.

FIG. 7 is a schematic diagram showing a correction method of the sensor system according to the embodiment of the present invention. In the present embodiment, although the target display arranged in the x-axis direction and a configuration in which the detection target moves in the x-axis direction are exemplified, the same process as below is performed in the y-axis direction.

As in FIG. 4 to FIG. 6, in FIG. 7, the input determination distance TS is displayed by a dotted line above the sensor module 200, and a correction start distance SS and an angle determination start distance AS are displayed by dotted lines above the input determination distance TS. The angle determination start distance AS indicates a distance at which the processor 220 starts calculation of the moving direction of the detection target in the present coordinate. The correction start distance SS indicates a distance at which the processor 220 starts determining whether or not to start correction of the coordinates of the detection target.

After the detection target is closer to the sensor module 200 than the angle determination start distance AS, the processor 220 starts calculation of movement information indicating the movement direction of the detection target based on coordinates of the detection target and a shift amount based on the movement information. When the detection target is closer to the sensor module 200 than the correction start distance SS, the processor 220 starts correction based on the shift amount. In FIG. 7, "black circles (•)" and "white circles (○)" indicate coordinates at which the detection target is detected by the sensor module 200. These coordinates are detected by the sensor module 200.

As shown in FIG. 7, when the detection target reaches the angle determination start distance AS, the processor 220 starts calculation of movement information indicating the movement direction of the detection target based on the coordinates at which the detection target is detected. The coordinates of the detection target are detected every predetermined period (for example, one frame), coordinates of the current detection target are updated each time the detection is performed, and coordinates of the past detection target are stored in the storage unit 258. For example, a ring buffer is used as the storage unit 258. The latest coordinate data and past coordinate data from the latest coordinate data to m−1 previous coordinate data are stored in the ring buffer (m is a natural number of 2 or more). For example, in a case where detection of the detection target is performed for each frame, coordinate data for m frames is stored in the ring buffer. In the ring buffer, the oldest coordinate data is deleted each time the latest coordinate data is stored.

When the detection target approaches the sensor module 200 from the angle determination start distance AS and a distance from the sensor module 200 to the detection target reaches the correction start distance SS (point P40; first point), the processor 220 calculates a correction amount of the present coordinates of the detection target (hereinafter, referred to as "detection position") based on the movement information in the coordinates of the detection target, and starts the correction. Specifically, as shown in FIG. 7, the processor 220 calculates the movement information of the detection target that has reached a point P41, based on the coordinate data of the m points stored in the ring buffer. In the example of FIG. 7, m is 4. Coordinates used for calculating the movement information are indicated by "white circles (○)", and other coordinates (coordinate data stored before coordinate data displayed by the white circles (○)) are indicated by "black circles (•)". The region surrounded by the dotted line shown in the upper right of FIG. 7 is an enlarged view of part of the lower left drawing of FIG. 7. For example, the movement information is calculated based on an approximation line with respect to coordinates of m points in the past. Specifically, inclination of the approximate line corresponds to the movement information. In the example shown in FIG. 7, the movement information (inclination) is angle information related to an angle θ of the approximate line with respect to the direction perpendicular to the main surface of the sensor module 200.

The method for calculating the movement information is not limited to the method described above. As will be described in detail later, for example, the coordinates of the latest m points may be divided into two segments of a first half and a second half, and an average value of coordinates included in the first half segment and an average value of coordinates included in the second half segment may be calculated, and the movement information (inclination) described above may be calculated based on these average values. Alternatively, the movement information may be calculated using only some coordinate data among the plurality of coordinate data stored in the ring buffer. In this case, for example, the movement information may be calculated using only the latest coordinate data and the oldest coordinate data. In the present embodiment, although a configuration is exemplified in which the entry angle θ of the detection target with respect to a normal of the sensor module 200 (the sensor panel 201) is calculated based on the latest coordinate data group as the movement information, the configuration is not limited to this configuration. For example, a vector including the angle θ and speed (or acceleration) may be calculated as the movement information.

Figure 8:
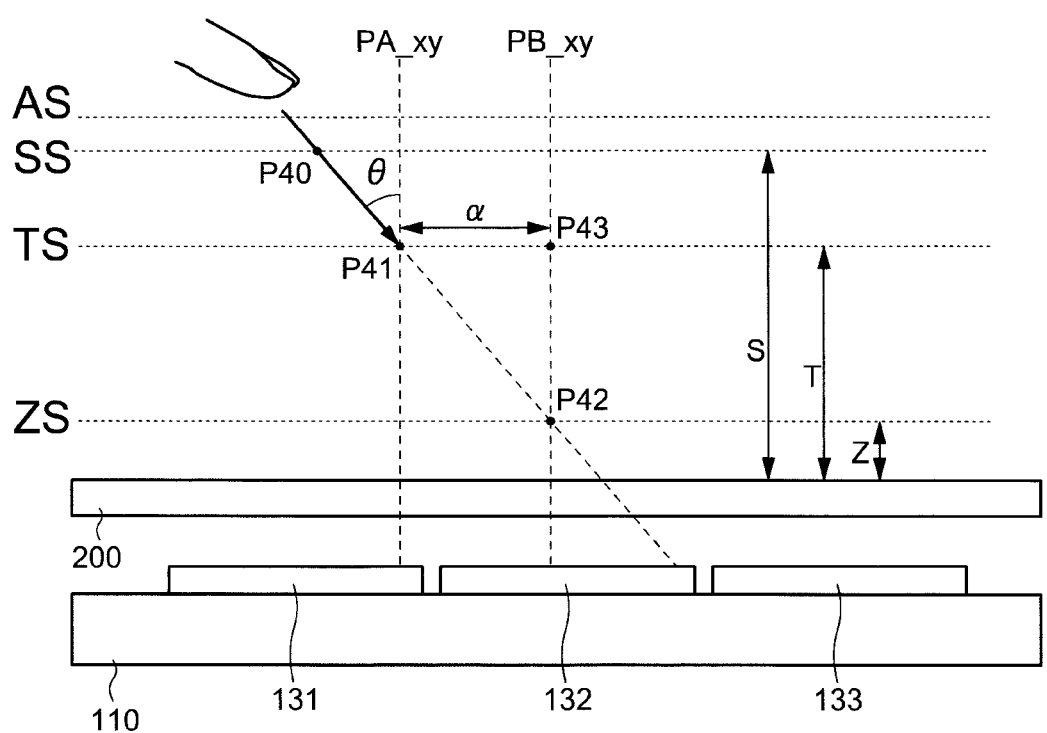
FIG. 8 is a schematic diagram showing the correction method of the sensor system according to the embodiment of the present invention.

FIG. 8 is a schematic diagram showing a correction method for the sensor system according to the embodiment of the present invention. A method for calculating a shift amount using the movement information calculated in FIG. 7 will be described with reference to FIG. 8. As described above, in the case where the user brings the detection target close to the main surface of the sensor module 200 in an oblique direction, a difference occurs between an input position intended by the user and a position of the input operation detected by the sensor module 200. This difference is the shift amount.

In FIG. 8, the correction start distance SS and the angle determination start distance AS are indicated by dotted lines above the input determination distance TS (in the positive direction of the z-axis), and a target distance ZS is indicated by dotted lines below the input determination distance TS (in the negative direction of the z-axis). The target distance ZS indicates a position assumed to be an input operation intended by the user operating the detection target.

In FIG. 8, a method for calculating a "shift amount α" which is a reference for calculating a correction amount in coordinates of the detection target will be described. In FIG. 8, the point P41 (second point) is a point at which a virtual line (a dotted line extending from the point P40 to the target display 132) extending from the point P40 (first point) toward the moving direction of the detection target (the direction of the angle θ with respect to the normal of the sensor module 200) reaches the input determination distance TS. A point P42 (third point) is a point at which the virtual line reaches the target distance ZS. The virtual line is calculated based on a position of the detection target in the point P40. In the present embodiment, the virtual line is calculated using the angle θ as the movement information. A point P43 is a point vertically above the point P42, and a distance from the sensor module 200 is the input determination distance TS.

In FIG. 8, "PA_xy" is an xy coordinate of the point P41. "PB_xy" is an xy coordinate of the point P42. The shift amount α is a distance between the point P41 and the point P43. In other words, the shift amount α is a distance between the point P41 and the point P42 in xy coordinates. In FIG. 8, a distance from the surface of the sensor module 200 to the correction start distance SS is displayed as "S", a distance from the surface to the input determination distance TS is displayed as "T", and a distance from the surface to the target distance ZS is displayed as "Z".

In the above cases, "PA_xy", "PB_xy", and α are expressed by the following equations based on P40.

$$PA\_xy = (S - T) \times \tan\theta$$

$$PB\_xy = (S - Z) \times \tan\theta$$

-continued $$\alpha = PB\_xy - PA\_xy$$

Note that the shift amount α is also expressed by the following equation $$\alpha = (T - Z) \times \tan\theta$$

When the detection target reaches the correction start distance SS following the angle determination start distance AS (point P40), the processor 220 starts calculation of the shift amount α based on the moving direction and coordinates of the detection target. Specifically, the processor 220 calculates the virtual line based on the coordinates in the point P40 and the moving direction of the detection target, and calculates the shift amount α using "PA_xy" and "PB_xy" calculated based on the virtual line. The shift amount α is calculated for each of the frames after the detection target reaches the angle determination start distance AS. The processor 220 calculates a correction amount in the coordinates of the detection target based on the shift amount α, and displays a cursor or the like on the coordinates corrected based on the calculated correction amount.

In other words, the processor 220 corrects the detected coordinates of the detection target based on the coordinates of the detection target and the angle information, and displays a cursor or the like on the corrected coordinates. Specifically, first, the processor 220 calculates a virtual line that forms an angle included in the angle information with respect to the z-axis and that is directed toward the sensor module 200 from the current coordinates of the detection target. Then, the processor 220 corrects the detection position based on the point P42 that is a point on the virtual line, and a distance from the sensor module 200 is the target distance ZS, between the coordinates and the main surface of the sensor module 200.

The target distance ZS means an arbitrary distance between the main surface of the sensor module 200 and the input determination distance TS. For example, the targeted distance ZS is a distance of 30% or more and 70% or less, a distance of 40% or more and 60% or less, or a distance of about 50% of the input determination distance TS.

As shown in FIG. 4 to FIG. 6, since the user cannot actually visually recognize the input determination distance TS, it is conceivable to bring the detection target closer to the sensor module 200 than the input determination distance TS in order to reliably perform the input operation. Therefore, an unintended input operation may be detected depending on an entry angle of the detection target. However, it is possible to reduce a shift between a position where the user recognizes that an input operation has been performed and a position where the processor 220 determines that the input operation has been performed by the processor 220 correcting the position where the input operation is performed as described above by the detection target.

[1-9. Sensor System Operation (when Approaching)]

Figure 9:
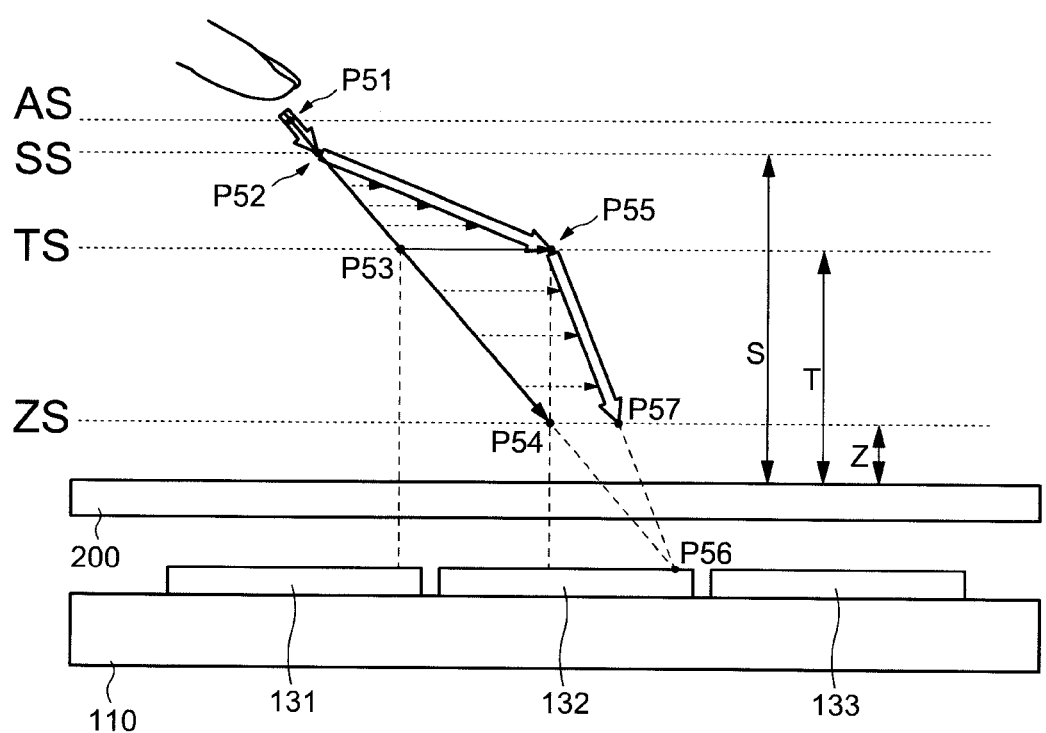
FIG. 9 is a schematic diagram showing an operation of the sensor system according to the embodiment of the present invention.

FIG. 9 is a schematic diagram showing an operation of the sensor system according to the embodiment of the present invention. With reference to FIG. 9, an example will be described in which a cursor is displayed on the coordinate corrected based on the shift amount α shown in FIG. 8 with respect to the actual movement of the detection target.

In FIG. 9, similar to FIG. 8, an angle determination start distance AS, a correction start distance SS, an input determination distance TS, and a target distance ZS are shown. In FIG. 9, a solid arrow indicates an actual movement of the detection target, a thick arrow (an arrow drawn with white inside) indicates a trajectory of the detection target after correction (a corrected trajectory), and a dotted arrow extending horizontally between the solid arrow and the thick arrow indicates a correction amount at each height position with respect to the main surface of the sensor module 200. Points P52 to P55 in FIG. 9 respectively correspond to the points P40 to P43 in FIG. 8.

As shown in FIG. 9, when the detection target approaches the sensor module 200 and a distance between the sensor module 200 and the detection target reaches the angle determination start distance AS (point P51), the processor 220 starts calculation of the moving direction and the shift amount α of the detection target in the present coordinates. Thereafter, when the detection target further approaches the sensor module 200 and the distance reaches the correction start distance SS (point P52), the processor 220 starts correction of the detection position with respect to the detection target based on the shift amount α.

When the correction of the detection position is started as described above, the processor 220 displays a cursor based on the corrected coordinate. The processor 220 determines the correction amounts at the respective height positions such that the correction amount of the coordinates coincides with the shift amount α when the detection target reaches the input determination distance TS. That is, when a distance between the sensor module 200 and the detection target reaches the input determination distance TS, the detection position is corrected based on the point P54 on the virtual line from the coordinates of the point P53 toward the sensor module 200, and the cursor is displayed on the coordinates of the point P55.

The point P54 is a point between the point P53 and the main surface of the sensor module 200 where the distance from the sensor module 200 is the targeted distance ZS. In other words, the point P54 is a position at which the user attempts to enter data using the detection target. Therefore, when the actual detection target is located at the point P53, the detection position is corrected so that the cursor is displayed at the corrected coordinates (point P55) intended by the user. In a top view, the position of the point P54 is the same as the position of the point P55. That is, the coordinates of the point P54 in the xy coordinates are the same as the coordinates of the point P55.

Next, the correction method described above is explained in detail. The processor 220 starts the correction of the detection position from the point P52, and gradually increases the correction amount of the detection position as the detection target approaches the sensor module 200.

Assuming that a distance from the sensor module 200 to the detection target in a certain frame is X, the correction amount between the point P52 and the point P53 can be expressed as follows.

$$\text{Correction amount} = \alpha \times (X - T)/(S - T)$$

In FIG. 9, the corrected trajectory is a straight line from the point P52 toward the point P55 because the detection target is linearly moved from the point P52 to the point P53. However, for example, in the case where the detection target moves in a curvilinear manner from the point P52 to the point P53, the corrected trajectory may have a curvilinear shape that is directed from the point P52 to the point P55 and that corresponds to the movement of the detection target.

When the processor 220 performs the correction as described above, and the detected target reaches the input determination distance TS, the processor 220 displays a cursor at the position of the point P55.

When the detection target further approaches the sensor module 200 along the virtual line from the position of the point P53, the processor 220 gradually decreases the correction amount of the detection position as the distance between the sensor module 200 and the detection target becomes smaller than the input determination distance TS (the detection target approaches the target distance ZS). In other words, the correction amount is the largest when the distance between the sensor module 200 and the detection target is the input determination distance TS. As the detection target moves downward from the input determination distance TS, the correction amount decreases. When a point at which the virtual line reaches the target display 132 is a point P56, the correction amount of the detection position is adjusted so that the corrected trajectory is directed to the point P56 from the point P55.

Assuming that a distance from the sensor module 200 to the detection target in a certain frame is X, a correction amount between the point P53 and the point P54 can be expressed as follows.

$$\text{Correction amount} = \alpha \times (X - D)/(T - D)$$

In an example of FIG. 9, since the detection target is linearly moved from the point P53 toward the point P56, the corrected trajectory is linearly shaped from the point P55 toward the point P56. However, for example, in the case where the detection target moves in a curvilinear manner from the point P53 toward the point P56, the corrected trajectory may have a curvilinear shape that is directed from the point P55 toward the point P56 and that corresponds to the movement of the detection target.

As a result of the processor 220 performing correction as described above, when the detected target moves from the point P53 toward the point P54 to reach the target distance ZS, the processor 220 displays a cursor at a position of a point P57 between the point P55 and the point P56.

Even in the case where the user brings the detection target closer to the main surface of the sensor module 200 in an oblique direction, the display reflecting the user's intention can be performed by correcting the detection position of the detection target as described above. In particular, it is possible to provide a touch sensor system that does not feel uncomfortable to the user by adjusting the correction amount in accordance with the distance between the sensor module 200 and the detection target.

It is possible to provide the user with a touch sensor system that does not feel uncomfortable by correcting the detection position of the detection target as described above.

[1-10. Operation Flowchart of Sensor System]

Figure 10:
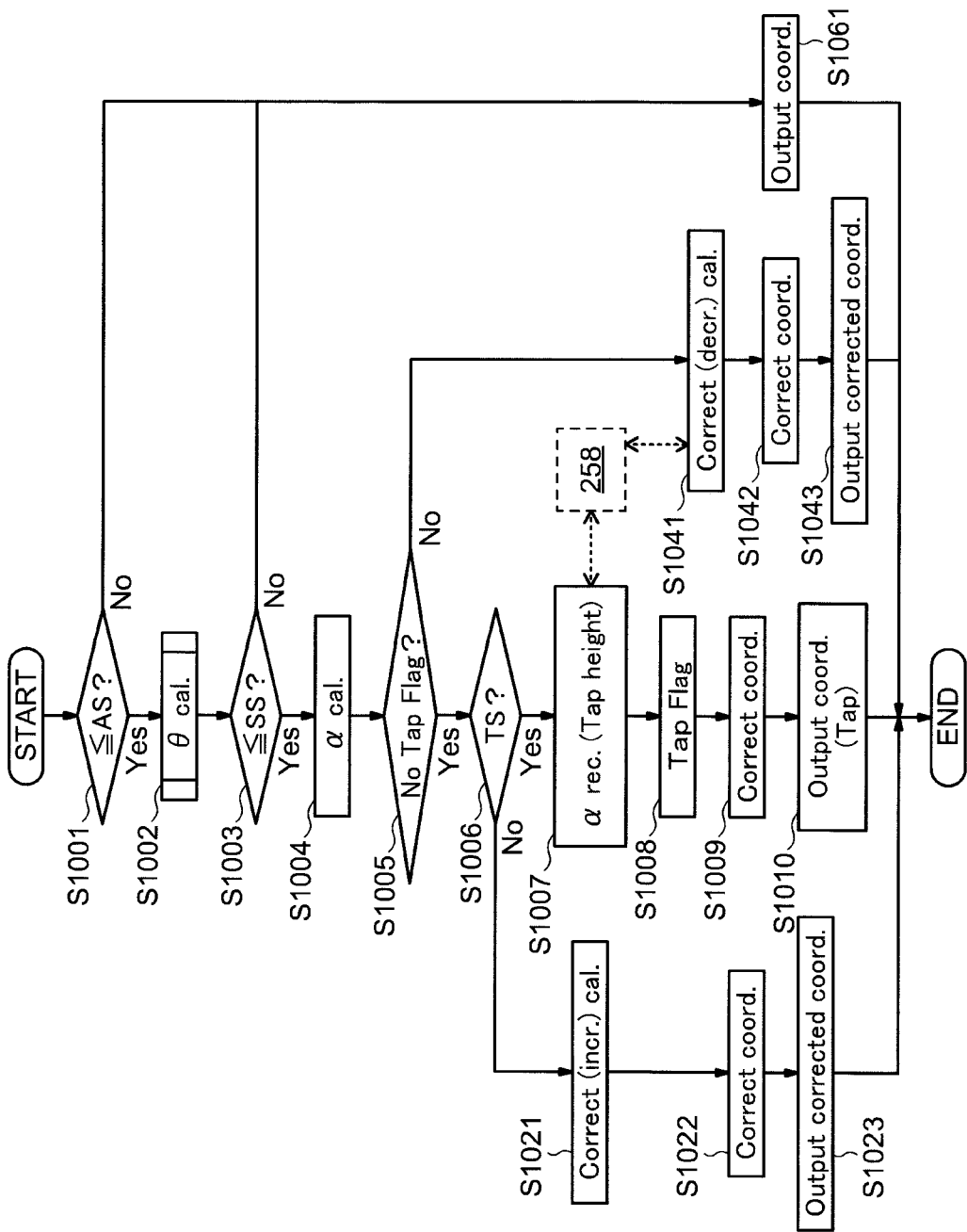
FIG. 10 is a flowchart showing an operation of a sensor system according to an embodiment of the present invention.

FIG. 10 is a flowchart showing operations of a sensor system according to an embodiment of the present invention. Each of the operations shown in FIG. 10 is mainly executed by the processor 220. A series of flows shown in FIG. 10 is performed for each frame.

When the operation of the sensor system starts, first, the sensor module 200 detects a position of a detection target. The processor 220 determines whether or not the angular calculation is necessary based on the detection position (S1001; ≤AS?). Specifically, in the step S1001, when a distance from the sensor module 200 to the detection target is equal to or smaller than the angle determination start distance AS ("Yes" in S1001), the processor 220 calculates movement information indicating a movement direction of the detection target. Specifically, as shown in FIG. 7, the processor 220 calculates the angle θ of the moving direction of the detection target with respect to the z-axis (S1002; θ cal.). On the other hand, in the step S1001, when the distance from the sensor module 200 to the detection target exceeds the angle determination start distance AS ("No" in S1001), the processor 220 outputs coordinates of the present detection target (S1061; Output coord.), and ends the flowchart of FIG. 10.

After the processor 220 calculates the angle θ in the step S1002, the processor 220 performs a correction start determination based on the detection position of the detection target (S1003; ≤SS?). Specifically, in the step S1003, when the distance from the sensor module 200 to the detection target is equal to or smaller than the correction start distance SS ("Yes" in S1003), the processor 220 calculates the shift amount α in the manner shown in FIG. 8 (S1004; α cal.). On the other hand, in the step S1003, when the distance exceeds the correction start distance SS ("No" in S1003), the processor 220 outputs the coordinates of the present detection target (S1061), and ends the flowchart of FIG. 10.

If the shift amount α is calculated in the step S1004, the processor 220 determines whether or not there is a Tap flag indicating that an input operation has been performed (S1005; No Tap Flag?). In the present embodiment, the Tap flag is set when the detection target has already reached the input determination distance TS (the case where an input operation has already been performed). Therefore, in the case where there is no Tap flag (Tap flag is not set) ("Yes" in S1005), the processor 220 determines that the detection target has not been input yet. On the other hand, in the case where the Tap flag is present ("No" in S1005), the processor 220 determines that an input operation has been performed on the detection target, and calculates a correction amount (S1041; Correct (decr.) cal.). The calculation of the corrections in the step S1041 will be described later.

If it is determined in the step S1005 that there is no Tap flag, the processor 220 performs tapping determination based on the detection position of the detection target (S1006; TS?). Specifically, when the distance from the sensor module 200 to the detection target is equal to or smaller than the input determination distance TS in S1006 ("Yes" in S1006), the processor 220 records the shift amount α at the coordinates determined to have been performed with an input operation (S1007; a rec. (Tap height)) in the storage unit 258. On the other hand, when the distance exceeds the input determination distance TS ("No" of S1006), the processor 220 determines that an input operation has not been performed on the detection target, and calculates a correction amount (S1021; Correct (incr.) cal.).

When the shift amount α is recorded in the step S1007, the processor 220 sets a Tap flag (S1008; Tap Flag), performs coordinate correction based on the shift amount α (S1009; Correct coord.), and outputs the corrected coordinates and information indicating that an input operation has been performed (S1010; Output coord. (Tap)), and ends the flowchart of FIG. 10.

Even in the case where it is determined in the step S1003 that the correction of the detection position of the detection target is started, in the step S1005 or the step S1006, an adjustment method of the correction amount differs depending on whether the present status is determined to be prior to the detection of the input operation or after the detection of the input operation. Specifically, as shown in FIG. 9, before the detection of the input operation (point P52 to point P53), the processor 220 gradually increases the correction amount in the step S1021 as the detection target approaches the sensor module 200. On the other hand, after the detection of the input operation (point P53 to point P54), the processor 220 gradually decreases the correction amount in the step S1041 as the detection target approaches the sensor module 200.

When the correction amount (increment) is calculated in the step 1021, the processor 220 performs coordinate correction based on the calculated correction amount (S1022; Correct coord.), and outputs information indicating the corrected coordinate (S1023; Output corrected coord.), and ends the flowchart of FIG. 10.

When the correction amount (gradual decrease) is calculated in the step 1041, the processor 220 performs coordinate correction based on the calculated correction amount (S1042; Correct coord.), outputs information indicating the corrected coordinates (S1043; Output corrected coord.), and ends the flowchart of FIG. 10. In the case of performing the calculation of the step S1041, the processor 220 calculates the correction amount by using the shift amount α recorded in the storage unit 258.

In FIG. 9, the processor 220 performs the process of the steps S1021 to S1023 during the time the detection target reaches the point P53 after the detection target approaches the sensor module 200 from the point P51 and reaches the point P52. When the detection target reaches the point P53, the processor 220 performs the steps S1007 to S1010. After the detected target reaches the point P53, the processor 220 performs the steps S1041 to S1043.

[1-11. Angle Calculation]

Figure 11:
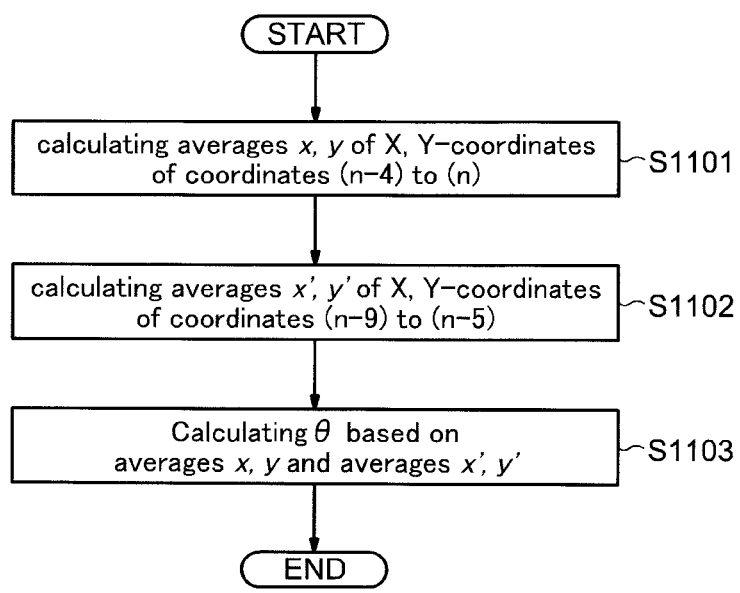
FIG. 11 is a flowchart showing an angle calculation of a sensor system according to an embodiment of the present invention.

FIG. 11 is a flowchart showing an angle calculation of a sensor system according to an embodiment of the present invention. The angle calculation shown in FIG. 11 is an exemplary calculation of movement information in the present embodiment, and is a calculation performed by a θ calculation in the step S1002 when a distance from the sensor module 200 to the detection target is equal to or smaller than the angle determination start distance AS ("Yes" in S1001) in S1001 of FIG. 10. The calculation of the angle θ is performed by the processor 220. FIG. 11 shows an example of the angle calculation performed on the (n)th frame.

As shown in FIG. 11, first, the processor 220 calculates an average value (x, y) of an x coordinate and a y coordinate of a coordinate (n−4) to a coordinate (n) in respect to (n−4)th to (n)th frames (S1101). Subsequently, the processor 220 calculates an average value (x', y') of an x coordinate and a y coordinate of a coordinate (n−9) to a coordinate (n−5) with respect to (n−9)th to (n−5)th frames (S1102). For example, the x coordinate and the y coordinate of the coordinate (n−4) to the coordinate (n) are stored in the first buffer, and the x coordinate and the y coordinate of the coordinates (n−9) to the coordinate (n−5) are stored in the second buffer. Coordinate data stored in the first buffer and the second buffer is updated for each frame. Then, the processor 220 calculates the angle θ based on the average value (x, y) and the average value (x', y') (S1103).

Although FIG. 11 shows a configuration in which the angular calculation is performed based on the average value of the five frames of the coordinate (n−4) to the coordinate (n) and the average value of the five frames of the coordinate (n−9) to the coordinate (n−5), the configuration is not limited to this configuration. The number of frames for calculating an average value in each buffer may be four or less, or six or more. The number of frames of coordinates used for calculating an average value in the step S1101 may be different from the number of frames of coordinates used for calculating an average value in the step S1102. Alternatively, the angular calculation may be performed based on an approximate line for the 10 coordinate data of the (n−9)th to (n)th frames.

[1-12. Sensor System Operation (when Moving Away)]

Figure 12:
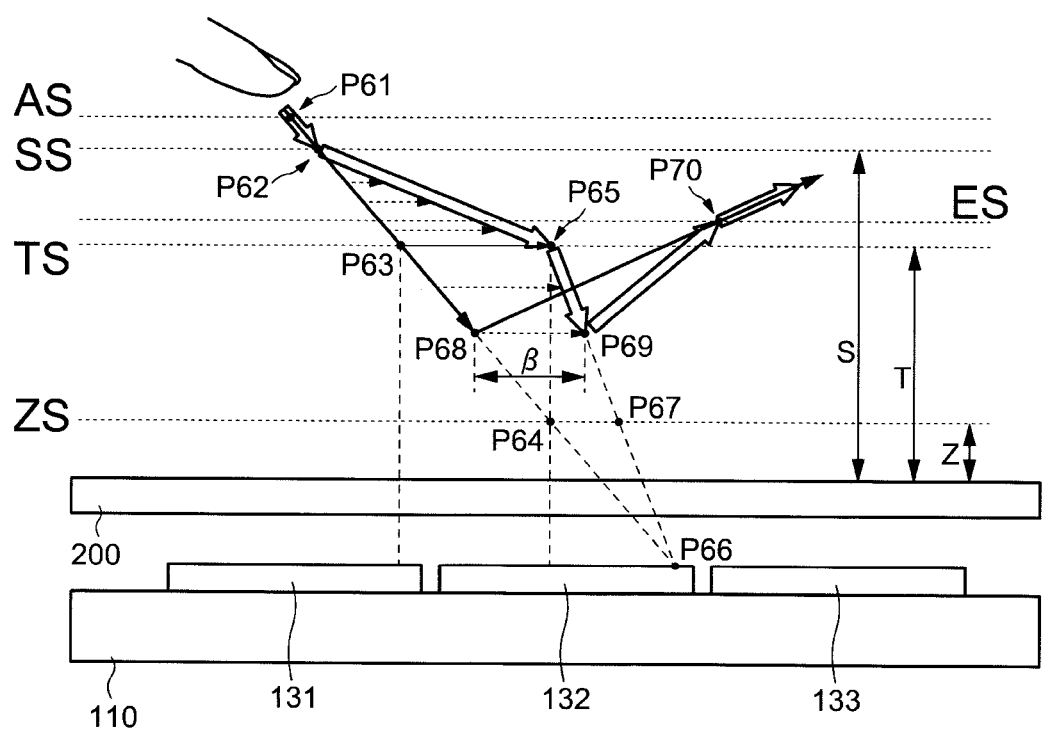
FIG. 12 is a schematic diagram showing an operation of a sensor system according to an embodiment of the present invention.

FIG. 12 is a schematic diagram showing an operation of the sensor system according to the embodiment of the present invention. With reference to FIG. 12, an example will be described in which, in the case where the detection target moves further upward (in the positive direction of the z-axis) after approaching the sensor module 200 than the input determination distance TS, a cursor is displayed on the coordinates corrected based on the shift amount α shown in FIG. 8.

In FIG. 12, similar to FIG. 9, the angle determination start distance AS, the correction start distance SS, the input determination distance TS, and the target distance ZS are shown, and in addition, a correction end distance ES is indicated by a dotted line. The correction end distance ES is arranged between the input determination distance TS and the correction start distance SS. Similar to FIG. 9, a solid arrow indicates actual movement of the detection target, a thick arrow (an arrow drawn with white inside) indicates a corrected trajectory, and a dotted arrow extending horizontally between the solid arrow and the thick arrow indicates a correction amount at each height position with respect to the main surface of the sensor module 200. Points P61 to P67 in FIG. 12 respectively correspond to the points P51 to P57 in FIG. 9. In the following description, description of the same configuration as in FIG. 9 will be omitted.

As shown in FIG. 12, the user brings the detection target closer to the sensor module 200 to a position where a distance from the sensor module 200 to the detection target is equal to or smaller than the input determination distance TS. In this case, the processor 220 determines that an input to the target display 132 has been performed by the detection target in consideration of the correction, and outputs the determination result to the computing device 300 through the interface 260. The control unit 302 of the computing device 300 receives the determination result and transmits a predetermined video signal to the display module 110. This changes the display of the screen of the display module 110. For example, a color of the target display 132 changes. Thus, the detection target is separated from the sensor module 200 after the user confirms the input. More specifically, the user moves the detection target upward between the input determination distance TS and the target distance ZS. As shown in FIG. 12, while the detection target moves from the point P61 to a point P68, the detection position is corrected and the cursor is displayed as in FIG. 9. When the detected target moves upward with the point P68 as the lowermost point in the trajectory of the solid arrow, the corrected trajectory also moves upward with a point P69 as the lowermost point in the trajectory of the thick arrow. As the detection target moves upward from the point P68 and moves away from the sensor module 200, the correction amount of the detection position gradually decreases.

When a distance from the surface of the sensor module 200 to the correction end distance ES is "ES" and the distance from the sensor module 200 to the detection target in a certain frame is X, the correction amount between the point P68 and a point P70 can be expressed as follows.

$$\text{Correction amount} = \alpha \times (X - ES)/(T - ES)$$

In other words, the processor 220 gradually decreases the correction amount of the detection position of the detection target as the distance from the sensor module 200 to the detection target becomes smaller than the input determination distance TS, and then gradually decreases the correction amount of the detection position as the detection target moves in the direction away from the sensor module 200 (in the positive direction of the z-axis).

As the detection target moves upward from the point P68 and approaches the correction end distance ES, the correction amount of the detection position decreases. The correction described above is performed so that the correction amount becomes zero when the detection target reaches the correction end distance ES (point P70). That is, the processor 220 performs control such that the correction amount of the detection position becomes zero when the distance from the sensor module 200 to the detection target reaches the correction end distance ES between the input determination distance TS and the correction start distance SS.

[1-13. Operation Flowchart of Sensor System]

Figure 13:
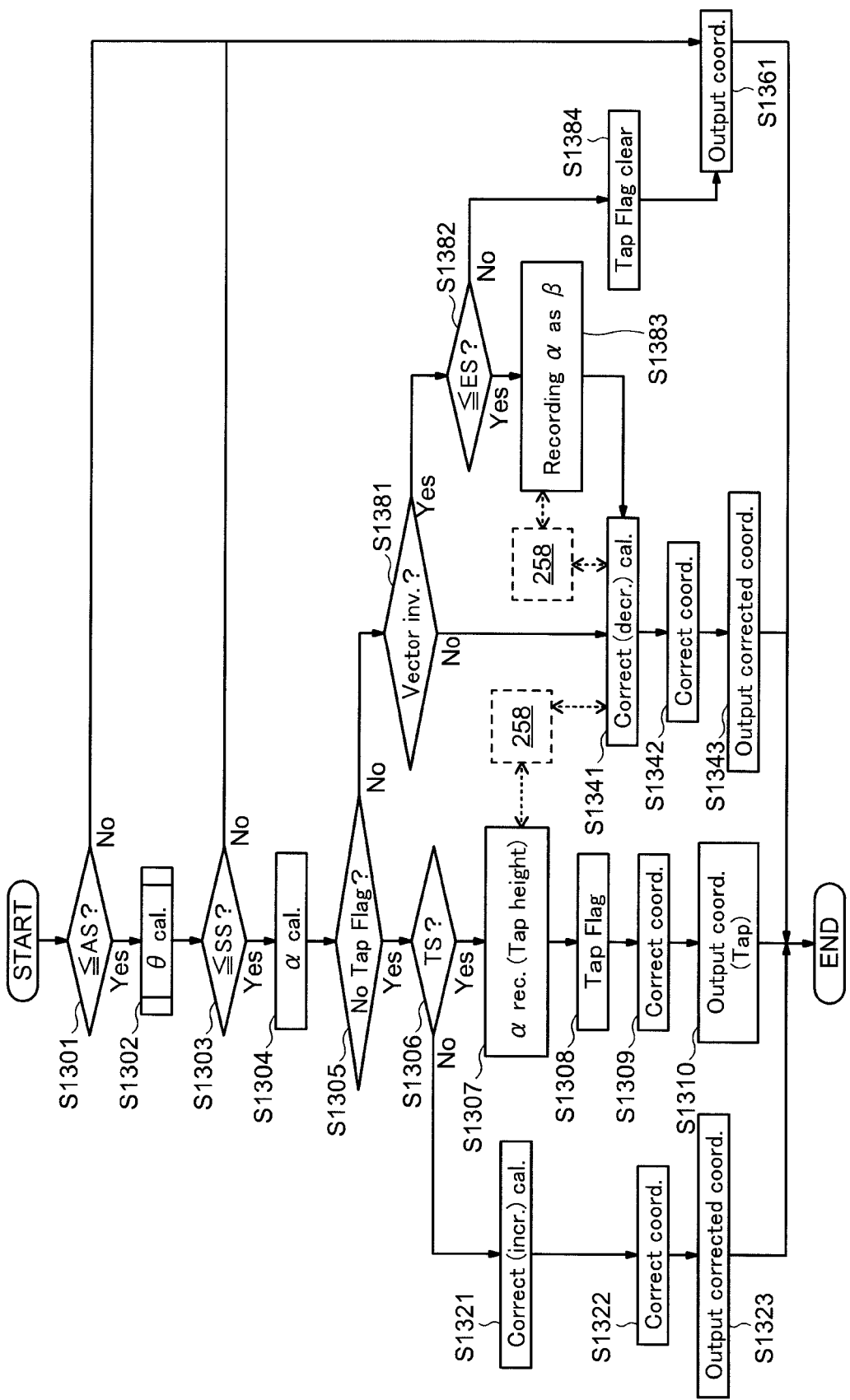
FIG. 13 is a flowchart showing an operation of a sensor system according to an embodiment of the present invention.

FIG. 13 is a flowchart showing operations of a sensor system according to an embodiment of the present invention. Each of the operations shown in FIG. 13 is mainly executed by the processor 220. A series of flows shown in FIG. 13 is performed for each frame. The flowchart shown in FIG. 13 is similar to the flowchart shown in FIG. 10. In the following description, the description of the same steps as those of the flowchart of FIG. 10 will be omitted, and steps different from those of the flowchart will be described.

Steps S1301 to S1310, S1321 to S1323, S1341 to S1343, and S1361 in FIG. 13 are the same steps as the steps S1001 to S1010, S1021 to S1023, S1041 to S1043, and S1061 in FIG. 10, respectively. On the other hand, FIG. 13 is different from FIG. 10 in that FIG. 13 has steps S1381 to S1384.

In the flow chart of FIG. 13, in the case where there is a Tap flag in the step S1305 ("No" in S1305), the processor 220 determines whether or not there is vector inversion with respect to movement information of the detection target (S1381; Vector inv.?). Specifically, the processor 220 determines whether the detection target is approaching the sensor module 200 or is moving away from the sensor module 200 based on the movement information.

In the step S1381, if the processor 220 determines that the detection target is approaching the sensor module 200 ("No" in S1381), it calculates the correction amount (gradual decrease) (S1341; Correct (decr.) cal.). On the other hand, in the step S1381, if the processor 220 determines that the detection target is moving away from the sensor module 200 ("Yes" in S1381), it determines whether or not the detection position of the detection target has reached the correction end distance ES (S1382; ≤ES?).

In the step S1382, when a distance from the sensor module 200 to the detection target is equal to or less than the correction end distance ES ("Yes" in S1382), the processor 220 records the shift amount α at the time when the vector is reversed (when the detection target is moved away from the movement approaching the sensor module 200) in S1381 as a shift amount ß (S1383; Recording a as B). The processor 220 records the shift amount ß in the storage unit 258. The shift amount β is a distance between the point P68 and the point P69 in the case where the detection target moves upward with the point P68 as the lowermost point. In other words, the shift amount β is the distance between the point P68 and the point P69 in the xy coordinate. Following the step S1383, calculation of the corrections (gradual decrease) is performed by the step S1341. In the case of calculating the step S1341, the processor 220 calculates the correction amount by using the shift amount ß recorded in the storage unit 258.

On the other hand, when the distance from the sensor module 200 to the detection target is larger than the correction end distance ES ("No" in S1382) in the step S1382, the processor 220 clears the Tap flag (S1384; Tap Flag clear), outputs the coordinates of the present detection target (S1361), and ends the flowchart of FIG. 13. Clearing the Tap flag means downing the Tap flag. That is, after the Tap flag is cleared, it is determined that there is no Tap flag in the step S1305.

As described above, according to the present embodiment, it is possible to provide such a novel sensor system and a driving method of the sensor system. In particular, a novel method for driving a sensor module in a sensor system using a noncontact sensor module can be provided. As a result, even in the case where the user brings the detection target close to the main surface of the sensor module 200 in an oblique direction, an input operation reflecting the user's intention can be detected.

[1-14. Programs]

The program according to the embodiment of the present invention is a program for realizing a driving method of the display device 100 in the sensor system described above. The program is configured to cause the control unit 302 of the computing device 300 to execute a series of operations. The program is configured to cause the control unit 302 to provide the display module 110 with video for assisting an input by the user, that is, video including an input region and a video signal for realizing video corresponding to an operation to the input region. The program is configured so that the processor 220 causes the control unit 302 to perform the calculation of a correction amount by detecting the input operation based on coordinates of the detection target and various distances (AS, SS, TS, ZS, and ES). The program is further configured to cause the control unit 302 to acquire the two-dimensional coordinates or the three-dimensional coordinates of the detection target from the processor 220.

The program may be distributed in a state of being stored in a medium readable by the computing device 300, or may be distributed in a state of being downloadable from a network such as the Internet via the communication unit 306. Therefore, the recording medium in which the program is stored is also included in the embodiment of the present invention.

2. Second Embodiment

Referring to FIG. 14 to FIG. 18, a sensor system, a method for driving the sensor system, and a program for implementing the method according to an embodiment of the present invention will be described.

[2-1. Operations of Sensor System]

Operations of the display device 100 in the sensor system having the configuration described above will be described. In the present embodiment, a method for detecting a position that does not give a feeling uncomfortable to the user even in the case where the position of the detection target abruptly changes in a vicinity of the input determination distance TS will be described.

Figure 14:
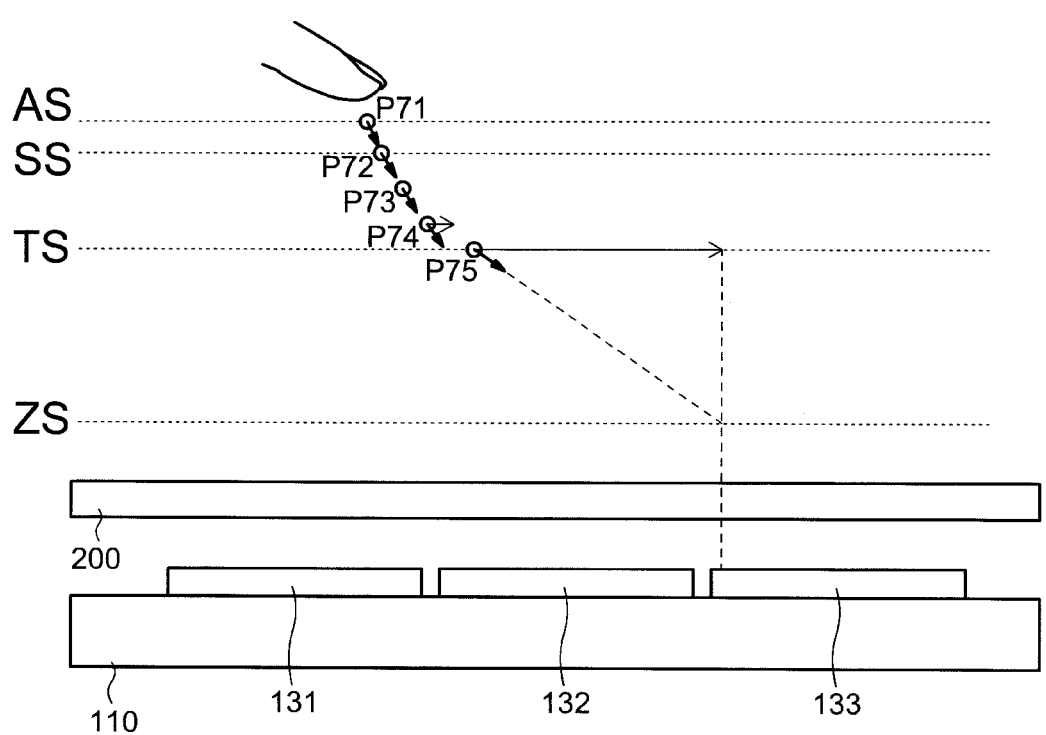
FIG. 14 is a schematic diagram showing an operation of a sensor system according to an embodiment of the present invention.
Figure 15:
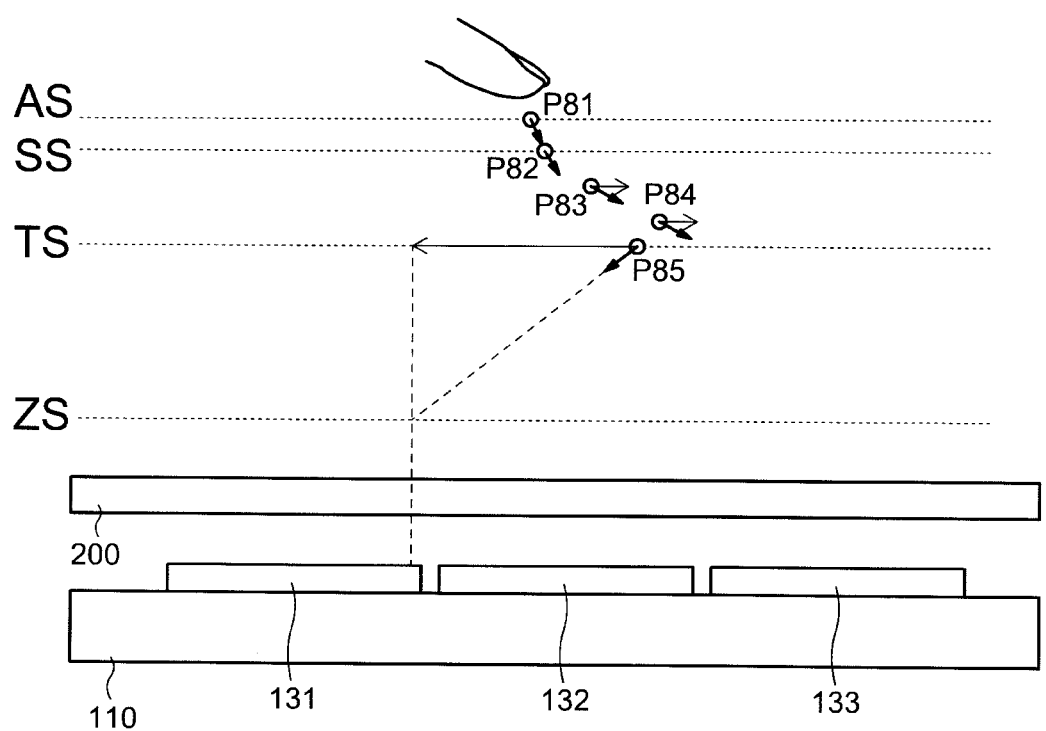
FIG. 15 is a schematic diagram showing an operation of a sensor system according to an embodiment of the present invention.

FIG. 14 and FIG. 15 are schematic diagrams for explaining the operation of the sensor system according to the embodiment of the present invention. In some cases, the user moves the detection target to perform an input operation on the target display 132, feels that the position of the detection target is not appropriate immediately before the detection target reaches the input determination distance TS, and adjusts the position of the detection target. FIG. 14 shows a case where a user who intends to select the target display 132 feels that there is a possibility that the detection target may select the target display 131 as it is immediately before the detection target reaches the input determination distance TS, and accelerates the movement of the detection target in the positive direction in the x-axis. On the other hand, FIG. 15 shows a case where a user who intends to select the target display 132 feels that there is a possibility that the detection target selects the target display 133 immediately before the detection target reaches the input determination distance TS, and pulls back the movement of the detection target in the positive direction of the x-axis in the negative direction.

As shown in FIG. 14, when the correction amount is calculated by the method shown in the first embodiment as a result of a large movement in the positive direction of the x-axis immediately before the detection target reaches the input determination distance TS, the detection position may be corrected to the position of the target display 133. As shown in FIG. 15, when the correction amount is calculated by the method shown in the first embodiment as a result of a movement in the negative direction of the x-axis immediately before the detection target reaches the input determination distance TS, the detection position may be corrected to the position of the target display 131. In this way, when the movement of the detection target abruptly changes in a vicinity of the input determination distance TS, the processor 220 may detect an input operation that does not reflect the intent of the user.

Figure 16:
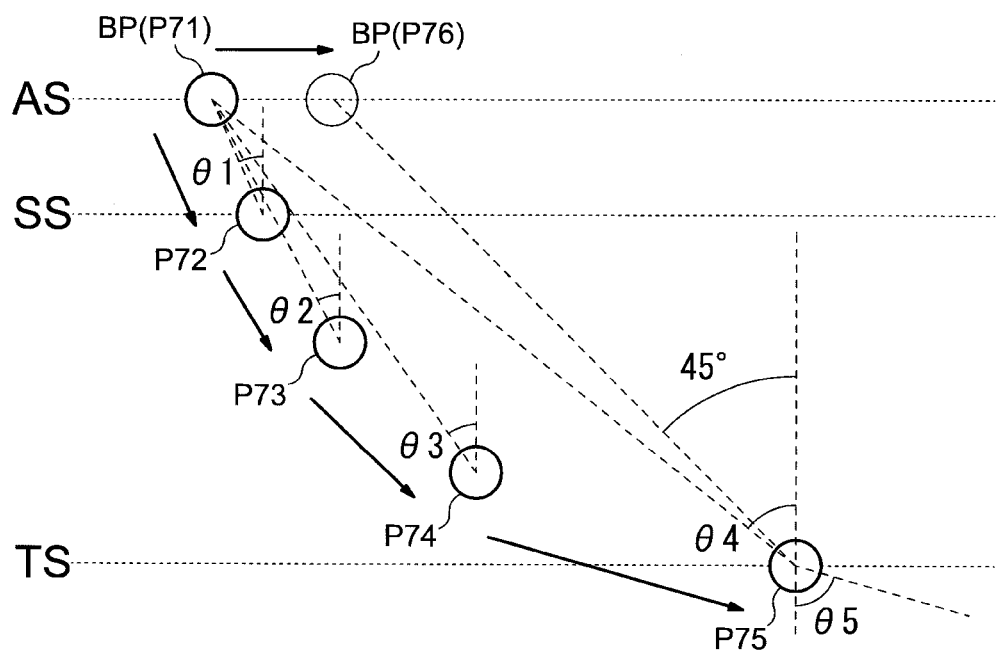
FIG. 16 is a schematic diagram showing an operation of a sensor system according to an embodiment of the present invention.
Figure 16:
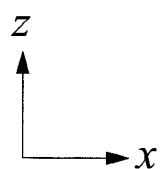
Figure 17:
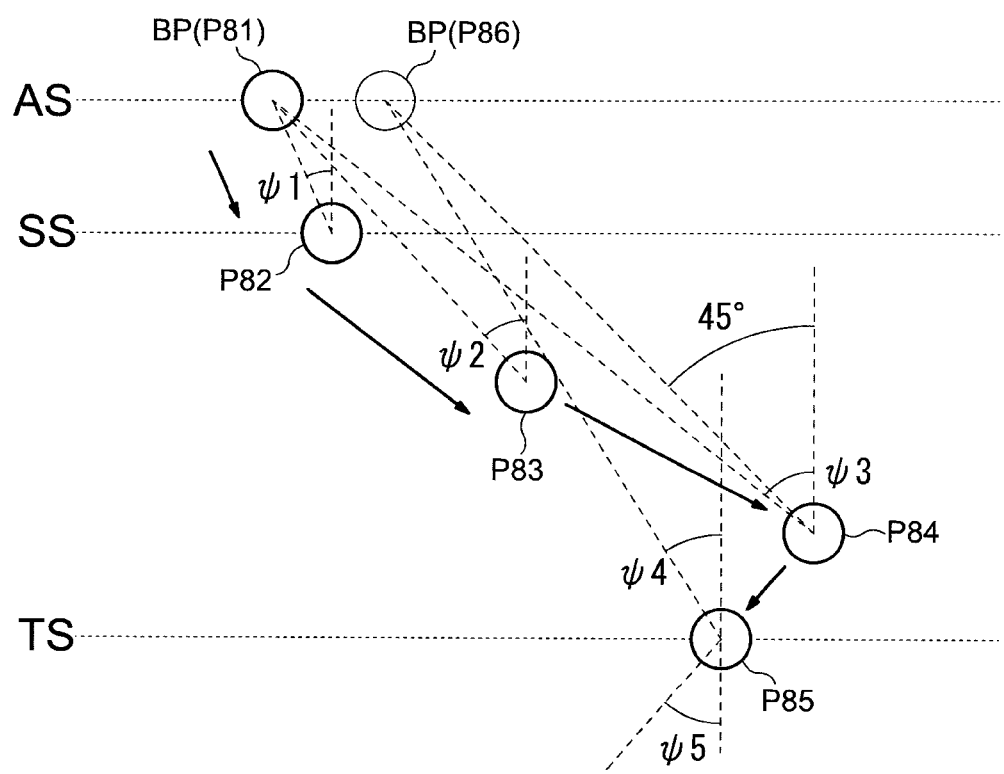
FIG. 17 is a schematic diagram showing an operation of a sensor system according to an embodiment of the present invention.

Embodiments for suppressing the phenomenon described above will be described with reference to FIG. 16 and FIG. 17. FIG. 16 and FIG. 17 are schematic diagrams for explaining operations of the sensor system according to the embodiment of the present invention. FIG. 16 is a view corresponding to the case of FIG. 14. FIG. 17 is a view corresponding to the case of FIG. 15. In these drawings, an angle determination start distance AS, a correction start distance SS, and an input determination distance TS are shown. Further, in these drawings, a base point BP is shown at a position of the angle determination start distance AS. The base point BP is a point corresponding to the point P51 in FIG. 9, and is a point serving as a reference for the movement or the correction of the detection target. In the embodiment shown in FIG. 16 and FIG. 17, input operations that do not conform to the user's intention are suppressed by moving the base point in accordance with the movement of the detection target.

The base point BP is a point having a predetermined positional relationship with the present target. As described above, the base point BP is used to suppress erroneous position corrections in the case where the movement of the detection target abruptly changes in the vicinity of the input determination distance TS. A position of the base point BP does not change when the base point BP is located within a predetermined range of conditions based on the coordinates of the present detection target in the case where the transition is made from a certain frame to the next frame. On the other hand, the position of the base point BP is adjusted when the base point BP is located outside the predetermined range. In the present embodiment, it is determined whether or not the position of the base point BP needs to be adjusted depending on whether or not the base point BP is located within a range of 45° with respect to the z-axis with reference to the coordinates of the present detection target. However, the angle with respect to the z-axis is not limited to 45°, and an angle can be appropriately set according to the application and purpose.

Further, when the movement information (for example, the angle θ) of the current detection target is included in a predetermined condition, the processor 220 calculates the correction amount without using the movement information. The base point BP described above may be used to determine whether or not it is included in the predetermined condition, or may be used to calculate the correction amount.

The setting and adjusting of the base point BP described above is controlled by the processor 220. The processor 220 sets a point at which the detection target approaches the sensor module 200 and a distance from the sensor module 200 to the detection target reaches the angular determination start distance AS as the base point BP. Further, the processor 220 updates the coordinates at which the detection target is detected in accordance with the movement of the detection target, and moves the base point BP based on coordinates of the updated detection target when the position of the base point BP is outside the predetermined range with reference to the coordinates of the updated detection target. More specifically, when the position of the base point BP is outside the range of 45° with respect to the z-axis with respect to the coordinates of the updated detection target, the processor 220 moves the base point BP to a position where the distance from the sensor module 200 is the angle determination start distance AS and 45° with respect to the z-axis with respect to the coordinates of the detection target.

A detailed description will be given with reference to FIG. 16. FIG. 16 shows coordinates (points P71 to P75) of the detection target for five frames. The coordinate (point P71) of the detection target in the first frame reaches the angle determination start distance AS. In this case, the processor 220 sets the point P71 as the base point BP. The coordinate (point P72) of the detection target in the second frame reaches the correction start distance SS. In this case, the coordinate of the detection target is updated from the point P71 to the point P72. At this time, an angle θ1 formed between a line segment connecting the point P72 and the point P71 and the z-axis is 45° or less. That is, the position of the base point BP does not move because the position of the base point BP is within 45° with respect to the z-axis with respect to the point P72.

The coordinates of the detection target in the third frame and the fourth frame are the point P73 and the point P74. At these times, an angle θ2 formed between a line segment connecting the point P73 and the point P71 and the z-axis, and an angle θ3 formed between a line segment connecting the point P74 and the point P71 and the z-axis are both 45° or less. That is, the position of the base point BP does not move because the position of the base point BP is within 45° with respect to the z-axis with respect to the point P73 and the point P74.

The coordinate (point P75) of the detection target in the fifth frame reaches the input determination distance TS. In this case, an angle θ4 formed between a line segment connecting the point P75 and the point P71 and the z-axis is 45° or more. That is, the position of the base point BP moves to a point P76 because the position of the base point BP is outside the range of 45° with respect to the z-axis with respect to the point P75.

In such a case, when the correction amount is calculated by the method shown in the first embodiment, the correction amount is calculated based on an angle θ5 based on the moving direction of the detection target in the point P75, and therefore the processor 220 may detect an input operation that does not reflect the intention of the user. Therefore, in this case, the correction amount is calculated based on an angle(45°) Formed between the line segment connecting the present base point BP (point P76) and the point P75 and the z-axis instead of the angle θ5. Since the angle is smaller than the angle θ5, it is possible to prevent the correction amount from becoming excessively large in the positive direction of the x-axis.

In the present embodiment, although a reference angle for determining whether or not to adjust the position of the base point BP is 45°, the reference angle is not limited to 45°. The reference angle can be adjusted as appropriate.

Another example will be specifically described with reference to FIG. 17. FIG. 17 shows coordinates (points P81 to P85) of the detection target for five frames. The coordinate (point P81) of the detection target in the first frame reaches the angle determination start distance AS. In this case, the processor 220 sets the point P81 as the base point BP. The coordinate (point P82) of the detection target in the second frame reaches the correction start distance SS. In this case, the coordinate of the detection target is updated from the point P81 to the point P82. In this case, an angle ψ1 formed between a line segment connecting the point P82 and the point P81 and the z-axis is 45° or less. That is, the position of the base point BP does not move because the position of the base point BP is within 45° with respect to the z-axis with respect to the point P82.

The coordinate of the detection target in the third frame is the point P83. In this case, an angle ψ2 formed between a line segment connecting the point P83 and the point P81 and the z-axis is 45° or less. That is, the position of the base point BP does not move because the position of the base point BP is within 45° with respect to the z-axis with respect to the point P83.

The coordinate of the detection target in the fourth frame is the point P84. At this time, an angle ψ3 formed between a line segment connecting the point P84 and the point P81 and the z-axis is 45° or more. That is, the position of the base point BP moves to a point P86 because the position of the base point BP is outside the range of 45° with respect to the z-axis with respect to the point P84.

The coordinate (point P85) of the detection target in the fifth frame reaches the input determination distance TS. In this case, an angle ψ4 formed between a line segment connecting the point P85 and the base point BP (point P86) and the z-axis is 45° or less. That is, the position of the base point BP does not move because the position of the base point BP is within 45° with respect to the z-axis with respect to the point P85.

In such a case, when the correction amount is calculated by the method shown in the first embodiment, the correction amount is calculated based on an angle ψ5 based on a moving direction of the detection target in the point P85, and therefore, the processor 220 may detect an input operation that does not reflect the intention of the user. As shown in FIG. 17, in the case where the direction (in the positive direction of the x-axis) from the base point BP toward the point P85 is opposite to the moving direction (in the negative direction of the x-axis) of the detection target in the point P85 on the x-axis, the correction amount is calculated using an angle 0° instead of the angle ψ5. In this case, since the correction amount is zero, the coordinates of the detection target indicated by the point P85 are the detection positions. In other words, when the detection target reaches the input determination distance TS in the positive direction of the x-axis with reference to the base point BP, the correction amount when the detection target moves in the negative direction of the x-axis is zero.

In the present embodiment, although a configuration in which the processor 220 sets the correction amount to zero (a configuration in which the correction amount is calculated using an angle of 0°) when the condition described above is satisfied has been exemplified, the configuration is not limited to this configuration. For example, in the case where the condition described above is satisfied, the processor 220 may calculate a correction amount smaller than the correction amount calculated by the method of the first embodiment. Specifically, the processor 220 may calculate the correction using an angle smaller than the angle ψ5 in the point P85 of FIG. 17. That is, in the case where the correction amount calculated by the method of the first embodiment is "10" in the negative direction of the x-axis, a calculation method of a second embodiment may calculate the correction amount so as to be "1 to 9" in the same direction.

[2-2. Operation Flowchart of Sensor System]

Figure 18:
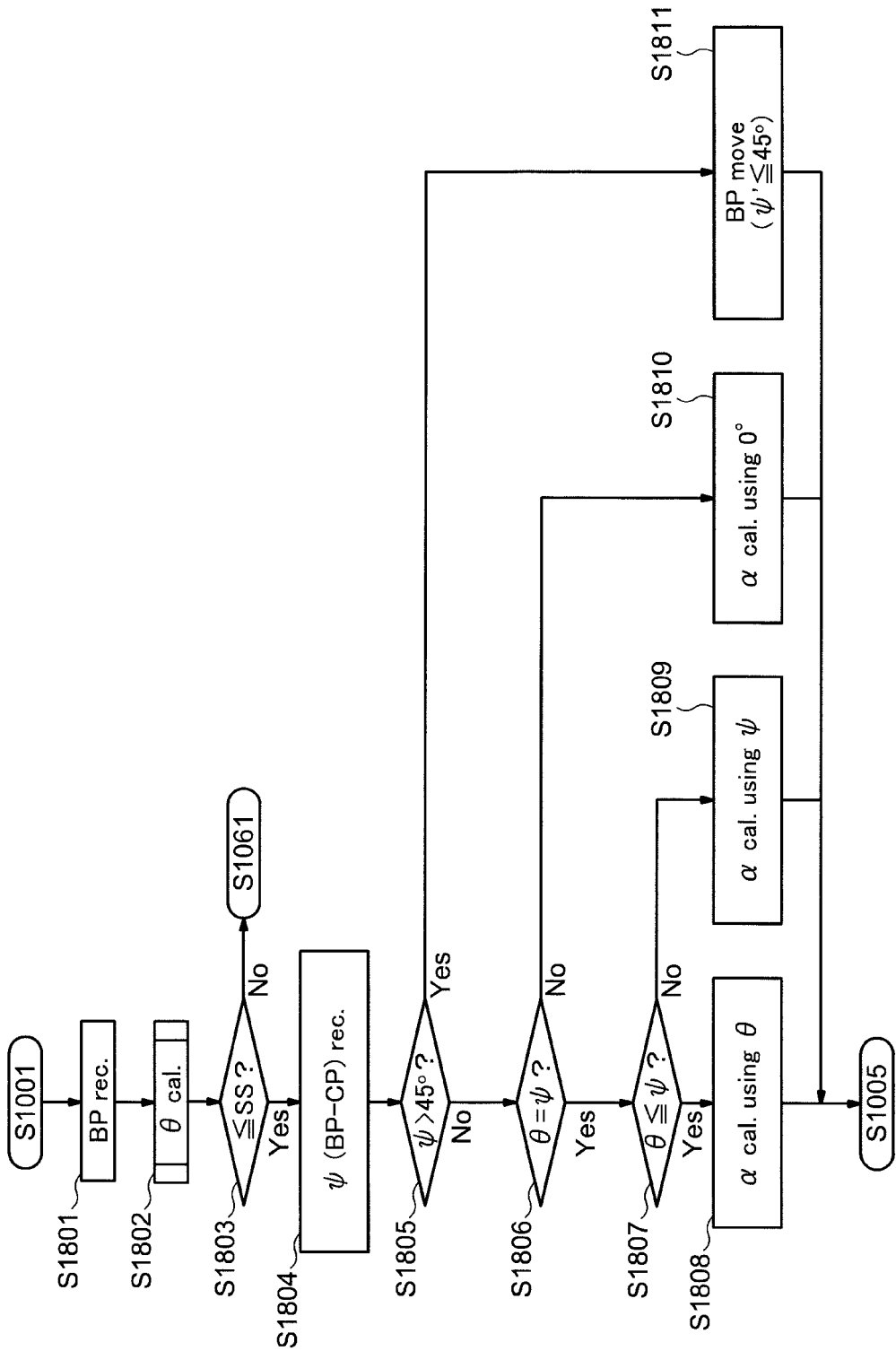
FIG. 18 is a flowchart showing an operation of a sensor system according to an embodiment of the present invention.

FIG. 18 is a flowchart showing operations of a sensor system according to an embodiment of the present invention. The operations shown in FIG. 18 are mainly executed by the processor 220. A series of flows shown in FIG. 18 is performed for each frame. In the flow chart shown in FIG. 18, although a configuration in which an angle of a reference for determining whether or not to adjust a position of the base point BP is 45° is exemplified, as described above, the angle is not limited to 45°.

The flowchart of the present embodiment is part of the flowchart of FIG. 10. Specifically, a step S1801 of FIG. 18 is a step subsequent to the step S1001 of FIG. 10, and the step S1005 of FIG. 10 is performed following steps S1808 to S1811 of FIG. 18. Steps S1802 and S1803 of FIG. 18 are the same as the steps S1002 and S1003 of FIG. 10.

As shown in FIG. 18, in the step S1001 of FIG. 10, when a distance from the sensor module 200 to the detection target is equal to or smaller than the angle determination start distance AS, the base point BP is recorded (S1801; BP rec.). Following the step S1801, the calculation of the angle θ (S1802; e cal.) and the correction start determination (S1803; ≤SS?) similar to S1002 and S1003 are performed.

In the step S1803, when the distance from the sensor module 200 to the detection target is equal to or smaller than the correction start distance SS ("Yes" in S1803), the processor 220 records an angle ψ of a straight line connecting the base point BP and the present coordinate of the detection target with respect to the z-axis (S1804; ψ (BP-CP) rec.).

After the angle ψ is recorded in the step S1804, the processor 220 determines whether the angle ψ is greater than 45° (S1805; ω>45°?). In the step S1805, when the angle ψ is 45° or less ("No" of S1805), the processor 220 determines whether or not plane components of the angle θ and the angle ψ are in the same direction (S1806; θ=ψ?). On the other hand, in the step S1805, when the angle ψ is 45° or more ("Yes" of S1805), the processor 220 moves the base point BP. When the processor 220 moves the base point BP, the processor 220 moves the base point BP so that an angle ψ' after the movement becomes 45° or less (S1811; BP move (ψ'≤45°).

In the step S1806, when a direction of a component in the x-axis direction of a vector forming the angle θ with respect to the z-axis and a direction of a component in the x-axis direction of a vector forming the angle ψ with respect to the z-axis are in the same direction ("Yes" in S1806), the processor 220 compares a magnitude relationship between the angle θ and the angle ψ (S1807; θ≤ψ?). On the other hand, in the step S1806, when the directions of the two components in the x-axis direction are the opposite directions ("No" in S1806), the processor 220 calculates the shift amount α based on the angle 0° (S1810; α cal. using 0°). In the present embodiment, although only the directions of the components of the two vectors in the x-axis direction are compared, the above comparison may be performed in consideration of the directions of the components in the y-axis direction.

In the step S1807, when the angle θ is equal to or less than the angle ("Yes" of S1807), the processor 220 calculates the shift amount α based on the angle θ (S1808; α cal. using θ). On the other hand, in the step S1807, when the angle θ is larger than the angle ψ ("No" of S1807), the processor 220 calculates the shift a based on the angle ψ (S1809; α cal. using ψ).

As described above, according to the determinations of the steps S1805 to S1807, the processor 220 calculates the shift amount α in any of the steps S1808 to S1811, and performs the process of the following step (S1005). The processes after the step S1005 are performed as shown in FIG. 10.

As described above, according to the present embodiment, the same advantages as those of the first embodiment can be obtained, and further, even in the case where the detection target operated by the user vibrates (trembles) or when the user suddenly moves the detection target in the vicinity of the input determination distance TS, it is possible to suppress a detection of an input operation not intended by the user by controlling the correction amount of the detection position.

3. Third Embodiment

Figure 19:
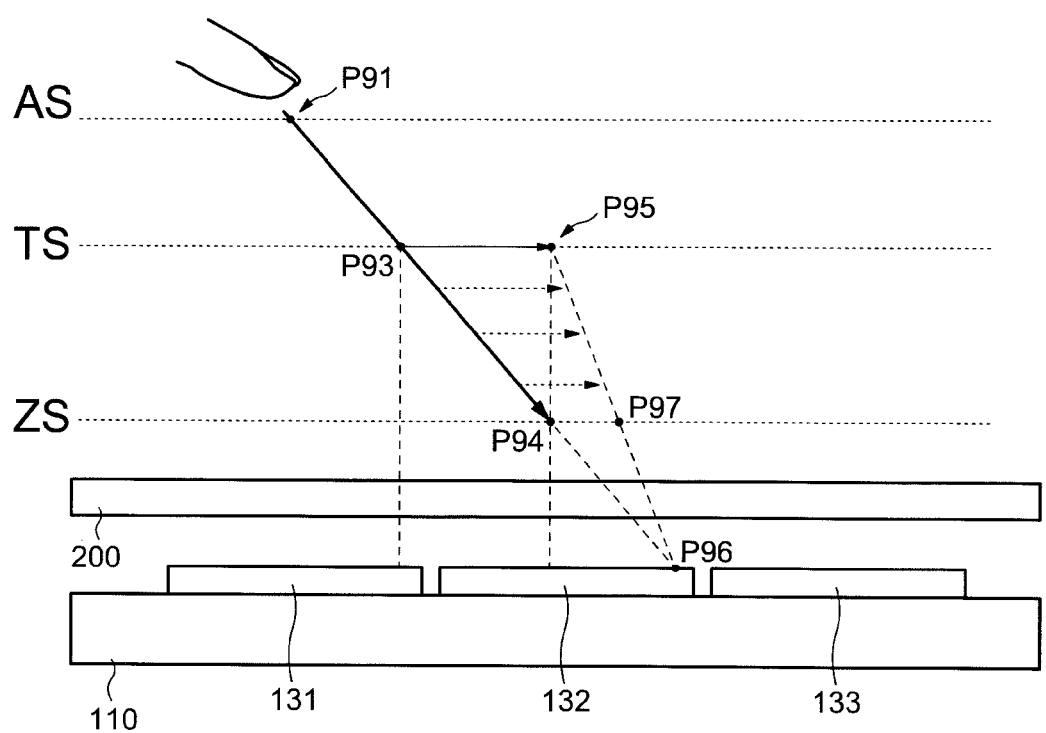
FIG. 19 is a schematic diagram showing an operation of a sensor system according to an embodiment of the present invention.

Referring to FIG. 19, a sensor system, a method for driving the sensor system, and a program for implementing the method according to an embodiment of the present invention will be described.

[3-1. Operation of Sensor System]

FIG. 19 is a schematic diagram showing operations of a sensor system according to an embodiment of the present invention. FIG. 19 is similar to FIG. 9, however, although FIG. 9 showed a configuration in which the correction amount gradually increases from the point P52 toward the point P55, in FIG. 19, the correction is not performed until a distance from the sensor module 200 to the detection target reaches the input determination distance TS, and the correction is performed when the distance reaches the input determination distance TS. Points P91, P93 to P97 in FIG. 19 correspond to the points P51, P53 to P57 in FIG. 9.

As shown in FIG. 19, when the detection target approaches the sensor module 200 and the distance between the sensor module 200 and the detection target reaches the angle determination start distance AS (point P91), the processor 220 starts calculation of a moving direction and the shift amount α of the detection target in the present coordinates. Thereafter, when the detection target further approaches the sensor module 200 and the distance reaches the input determination distance TS (point P93), the processor 220 corrects the detection position with respect to the detection target. Since the subsequent correction method is the same as the correction method of FIG. 9, the description thereof will be omitted.

Although not particularly shown in FIG. 19, a cursor display may be performed in the present embodiment. In this case, the cursor display may move from the point P91 to immediately before the point P93 as in the case of the detection target while the detection target moves from the point P91 to immediately before the point P93, and may move to the point P95 when the detection target reaches the point P93. Thereafter, the cursor display may move from the point P95 toward the point P97.

Additions, deletions, or design changes to constituent elements, or additions, omissions, or condition changes to processes made by a person skilled in the art based on each embodiment are also included in the scope of the present invention as long as the gist of the present invention is provided.

It is to be understood that the present invention provides other operational effects that are different from the operational effects provided by the aspects of the embodiments described above, and those that are obvious from the description of the present specification or that can be easily predicted by those skilled in the art.

What is claimed is:

1. A sensor system comprising:
   a noncontact sensor module arranged on a display module; and
   a processor configured to drive the sensor module,
   wherein the sensor module is configured to detect a first coordinate and a second coordinate of a detection target, and
   the second coordinate is detected before the first coordinate is detected, the processor is configured to:
      calculate move information indicating a moving direction of the detection target in the first coordinate based on the first coordinate and the second coordinate detected by the sensor module, and
      calculate a correction amount in the first coordinate based on the move information when the detection target approaches the sensor module and a distance between the sensor module and the detection target reaches a correction start distance;
   wherein the move information includes angle information indicating an angle with respect to a vertical direction perpendicular to a main surface of the sensor module.

2. The sensor system according to claim 1, wherein the processor is configured to calculate the move information based on past m number of coordinates (m is a natural number 2 or more).

3. The sensor system according to claim 2, wherein the processor is configured to calculate a correction amount in the first coordinate based on a coordinate of a first point and the angle information when the detection target reaches the correction start distance at the first point.

4. The sensor system according to claim 3, wherein the processor is configured to
   calculate a virtual line from a coordinate of the first point to the sensor module, the virtual line having an angle included in the angle information with respect to the vertical direction, and
   calculate a correction amount in the first coordinate based on a second point and a third point,
   the second point and the third point are points on the virtual line,
   the second point is a point at which a distance from the sensor module is an input determination distance smaller than the correction start distance between the first point and the main surface, and the third point is a point at which a distance from the sensor module is a target distance smaller than the input determination distance between the second point and the main surface.

5. The sensor system according to claim 1, wherein the processor is configured to gradually increase a correction amount of the first coordinate while a distance from the sensor module to the detection target varies from the correction start distance to the input determination distance.

6. The sensor system according to claim 4, wherein the processor is configured to
gradually increase a correction amount of the first coordinate while a distance from the sensor module to the detection target varies from the correction start distance to the input determination distance, and
calculate a correction amount in the first coordinate based on the second point and the third point when a distance between the sensor module and the detection target reaches the input determination distance.

7. The sensor system according to claim 6, wherein the processor is configured to gradually decrease a correction amount of the first coordinate in accordance with a decrease in a distance between the sensor module and the detection target compared to the input determination distance.

8. The sensor system according to claim 7, wherein the processor is configured to
gradually decrease a correction amount of the first coordinate in accordance with a decrease in a distance between the sensor module and the detection target compared to the input determination distance, and
subsequently gradually decrease a correction amount of the first coordinate in accordance with a movement of the detection target toward a direction away from the sensor module.

9. The sensor system according to claim 8, wherein the processor is configured to control a correction amount of the first coordinate to be zero when the detection target moves in a direction away from the sensor module and a distance between the sensor module and the detection target reaches a correction finish distance between the input determination distance and the correction start distance.

10. The sensor system according to claim 1, wherein the processor is configured to
set a point at which the detection target approaches the sensor module and a distance between the sensor module and the detection target reaches an angle determination start distance larger than the correction start distance as a base point,
update a coordinate of the detection target in accordance with a movement of the detection target, and
move the base point based on a coordinate of the detection target after the update when a position of the base point is positioned out of range of a predetermined condition with respect to the coordinate of the detection target after the update.

11. The sensor system according to claim 1, wherein the processor is configured to
set a point at which the detection target approaches the sensor module and a distance between the sensor module and the detection target reaches an angle determination start distance as a base point,
update a coordinate of the detection target in accordance with a movement of the detection target, and
move the base point based on a coordinate of the detection target after the update when an angle between a vertical line perpendicular to a main surface of the sensor module with respect to the base point and a straight line connecting a position of the base point and a coordinate of the detection target after the update is out of range of a predetermined angle.

12. The sensor system according to claim 11, wherein the processor is configured to move the base point to a first position on a line having a predetermined angle with the vertical line with respect to a coordinate of the detection target after the update and a distance between the first position and the sensor module is the angle determination start distance when an angle between the vertical line perpendicular to the main surface of the sensor module with respect to the base point and the straight line connecting the position of the base point and a coordinate of the detection target after the update is out of range of a predetermined angle.

13. The sensor system according to claim 1, wherein the processor is configured to display a cursor on the display module in accordance with the calculated correction amount.

14. A method for driving a noncontact sensor module arranged on a display module comprising:
deriving move information indicating a moving direction of a detection target in a first coordinate based on the first coordinate of the detection target and a second coordinate of the detection target, the first coordinate and the second coordinate being detected by the sensor module, the second coordinate being detected before the first coordinate is detected; and
deriving a correction amount in the first coordinate based on the move information when the detection target approaches the sensor module and a distance between the sensor module and the detection target reaches a correction start distance;
wherein the move information includes angle information indicating an angle with respect to a vertical direction perpendicular to a main surface of the sensor module.

15. A non-transitory computer-readable storage medium storing a program executed by a processor of a noncontact sensor module arranged on a display module comprising:
deriving move information indicating a moving direction of a detection target in a first coordinate based on the first coordinate of the detection target and a second coordinate of the detection target, the first coordinate and the second coordinate being detected by the sensor module, the second coordinate being detected before the first coordinate is detected; and
deriving a correction amount in the first coordinate based on the move information when the detection target approaches the sensor module and a distance between the sensor module and the detection target reaches a correction start distance;
wherein the move information includes angle information indicating an angle with respect to a vertical direction perpendicular to a main surface of the sensor module.

* * * * *